(12) United States Patent
Thomson et al.

(10) Patent No.: US 12,091,290 B2
(45) Date of Patent: Sep. 17, 2024

(54) MATERIALS MANAGEMENT SYSTEMS AND METHODS

(71) Applicant: Verton IP Pty Ltd, Milton (AU)

(72) Inventors: Stanley Thomson, Brisbane (AU); Andrew Miller, Brisbane (AU)

(73) Assignee: VERTON IP PTY LTD, Queensland (AU)

( * ) Notice: Subject to any disclaimer, the term of this patent is extended or adjusted under 35 U.S.C. 154(b) by 322 days.

(21) Appl. No.: 17/244,320

(22) Filed: Apr. 29, 2021

(65) Prior Publication Data

US 2021/0253404 A1   Aug. 19, 2021

Related U.S. Application Data

(63) Continuation of application No. 15/757,239, filed as application No. PCT/AU2016/050941 on Oct. 7, 2016, now Pat. No. 11,021,347.

(30) Foreign Application Priority Data

Oct. 8, 2015   (AU) ................................ 2015904106
Dec. 17, 2015   (AU) ................................ 2015905245

(51) Int. Cl.
| | |
|---|---|
| *B66C 13/06* | (2006.01) |
| *B66C 1/10* | (2006.01) |
| *B66C 13/08* | (2006.01) |
| *G06Q 10/06* | (2023.01) |
| *G06Q 10/0631* | (2023.01) |

(52) U.S. Cl.
CPC ................ *B66C 13/06* (2013.01); *B66C 1/10* (2013.01); *B66C 13/08* (2013.01); *G06Q 10/06* (2013.01); *G06Q 10/06313* (2013.01)

(58) Field of Classification Search
CPC ... B66C 13/06; G06Q 10/06; G06Q 10/06313
See application file for complete search history.

(56) References Cited

U.S. PATENT DOCUMENTS

| | | | |
|---|---|---|---|
| 8,025,167 B2 * | 9/2011 | Schneider ............. | B66C 13/063 212/276 |
| 9,375,841 B1 * | 6/2016 | Kemper ................. | B25J 13/085 |
| 9,797,723 B1 * | 10/2017 | Huang ................... | G01C 19/04 |
| 11,021,347 B2 * | 6/2021 | Thomson ................ | B66C 13/08 |

(Continued)

*Primary Examiner* — Kyle O Logan

(57) ABSTRACT

A material management method comprises receiving, via a processor, data relating to work activities and material flows from one or more sensors; generating, via the processor, safety and productivity information based on the data relating to work activities and material flows; comparing, via the processor, the generated safety and productivity information with existing project plans and schedules of the work activities and material flows; determining, via the processor, a present state and relative progress of the project plans and schedules of work; and generating, via the processor, updated project plans and schedules of work. The material can be a load and the method can comprise controlling a rotation of a suspended load by attaching two or more gyroscopic modules in communication with the processor directly or indirectly to the suspended load and independently controlling the two or more gyroscopic modules via the processor to control the rotation of the suspended load.

15 Claims, 16 Drawing Sheets

(56) References Cited

U.S. PATENT DOCUMENTS

| | | | | |
|---|---|---|---|---|
| 2009/0281655 A1* | 11/2009 | McKernan | ............... | B66F 9/20 |
| | | | | 700/229 |
| 2012/0051879 A1* | 3/2012 | Davis | ..................... | B66C 13/08 |
| | | | | 74/5.34 |
| 2013/0299440 A1* | 11/2013 | Hermann | .............. | B66C 15/065 |
| | | | | 340/8.1 |
| 2016/0009531 A1* | 1/2016 | Saliba | ................... | B66C 19/007 |
| | | | | 701/19 |
| 2016/0240417 A1* | 8/2016 | Tomida | ................ | B66C 13/085 |
| 2016/0297650 A1* | 10/2016 | Bang | .................... | B66C 13/085 |
| 2016/0298962 A1* | 10/2016 | Lee | ........................ | B64G 1/286 |
| 2017/0009859 A1* | 1/2017 | Sevagen | ................ | B64C 13/32 |
| 2018/0251346 A1* | 9/2018 | Thomson | ............... | B66C 13/08 |
| 2021/0253404 A1* | 8/2021 | Thomson | ............... | G06Q 10/06 |

* cited by examiner

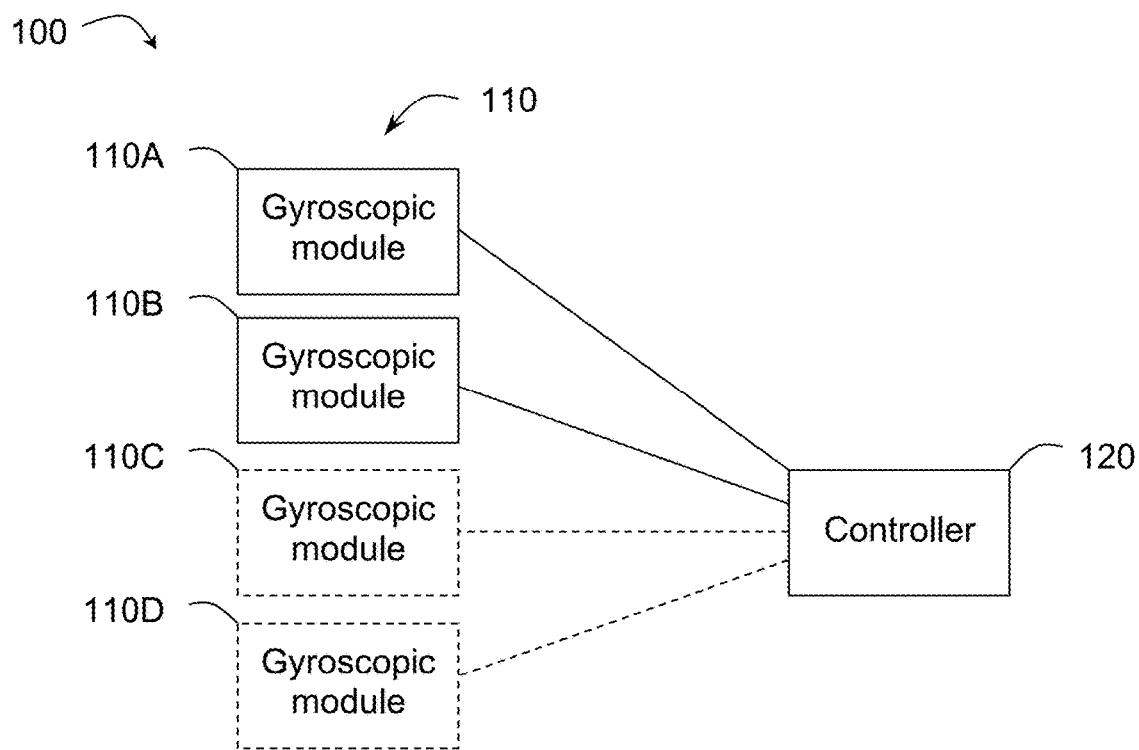
FIG. 1
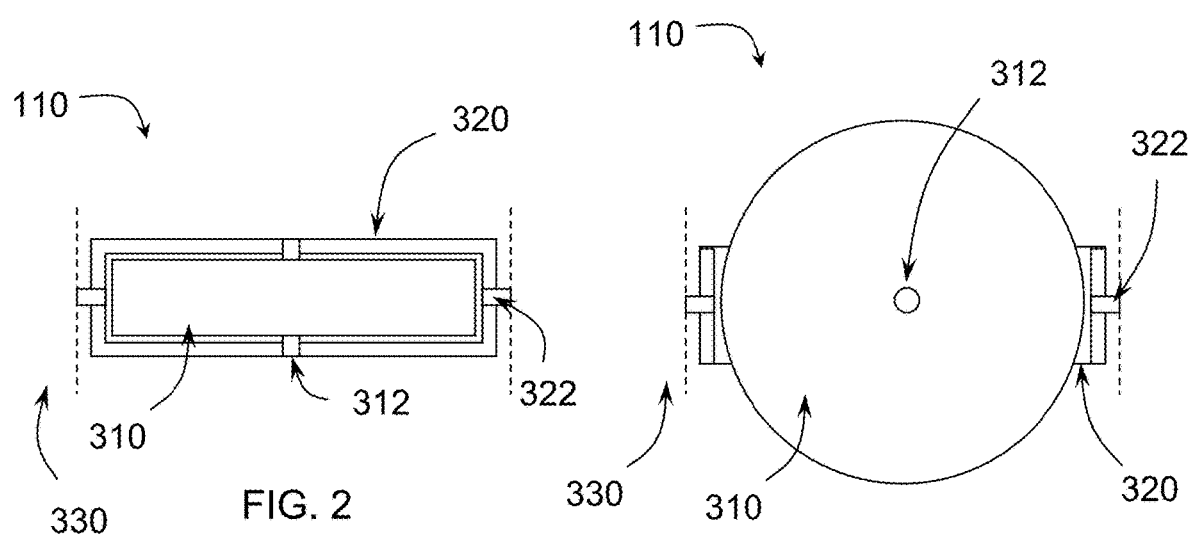
FIG. 2
FIG. 3

MATERIALS MANAGEMENT SYSTEMS AND METHODS

CROSS-REFERENCE TO RELATED APPLICATIONS

This application is a continuation of U.S. patent application Ser. No. 15/757,239, filed on Mar. 2, 2018, the disclosure of which is hereby incorporated by reference. In addition, this application claims the benefit of PCT Application No. PCT/AU2016/050941, filed on Oct. 7, 2016, the disclosure of which is hereby incorporated by reference. In addition, this application claims the benefit of Australian Patent Application No. 2015905245, filed on Dec. 17, 2015, the disclosure of which is hereby incorporated by reference. In addition, this application claims the benefit of Australian Patent Application No. 2015904106, filed on Oct. 8, 2015, the disclosure of which is hereby incorporated by reference.

FIELD OF THE INVENTION

The present invention relates to materials management systems and methods including load management systems and methods. In particular, embodiments of the present invention relate to orienting suspended loads via gyroscopic devices and measuring and generating data about loads and their movements, such as on construction sites, ports and in other environments.

BACKGROUND TO THE INVENTION

In some industries, such as transportation and construction, the diverse nature and geographical spread of the work makes it difficult to track productivity, progress, cost control, and safety issues. For example, a load may be relocated multiple times before it is put into a final position and therefore may be misplaced or lost.

In some industries, the movement of suspended loads, for example, via cranes, can pose a risk to surrounding workers and structures. While certain aspects of movement can be controlled by the crane, rotation of a load can often be unpredictable and influenced suddenly by environmental factors, such as wind.

Traditionally, the rotation of loads has been controlled via ropes or cables known as tag lines attached to the load which are manually pulled by workers. One problem with this approach is that there may be little space for personnel to get well away from the lifted load. Where loads are loaded and unloaded from trucks and/or ships, there can also be time pressure to load and unload quickly, and when unloading ships, there may be a requirement from customs to accurately record loads going on and loads going off the ships. Therefore, while workers are typically not allowed to stand directly under the suspended load for safety reasons, workers will often be required to stand almost under the load but off to one side where there is the possibility of being trapped between the suspended or partially suspended load and a fixed object or structure, or being knocked off a port or deck into the water. Another problem with this approach is that it can be slow and inaccurate.

Efforts have been made to provide improved systems for controlling the rotation of suspended loads. For example, a system described in U.S. Pat. No. 5,816,098 offers load orientation by providing a single control moment gyroscope (CMG) at a central point on a load beam.

One problem with this system is that the moment output of a CMG is limited by the physics of the gyroscope. In particular, the gyroscope can only provide an output torque through a certain angle of rotation. This means that the ability of the CMG to control the rotation of the load could effectively fail at a critical point during the lifting and placing of the load.

This problem can be partially addressed by increasing the weight of the rotor of the CMG such that it stores more momentum. However, increasing the weight of the rotor adds to the weight that must be lifted and therefore reduces operating flexibility and increases cost.

Furthermore, such a CMG with a large rotor has a considerable run up and run down time, requires a large motor, has large power consumption to drive the rotor, and must be used at a central location on the load or support beam to avoid unbalancing the load.

A further problem with using a CMG to control the rotation of the load is that the reorientation of the rotor of the CMG imparts undesired torques, such as pitch and/or roll, as well as the desired torque to rotate the load. The CMG will also typically create unwanted reactions to a manual rotation of the load which oppose the manual rotation of the load. Furthermore, if the rotor is allowed to reorient freely during manual reorientation of the load it will likely be in an undesirable orientation after the load has been reoriented.

International patent application publication number WO 2015/082347 describes another system for controlling the orientation of a suspended load. The system comprises a lifting frame to which a load to be lifted is connected. Two or more flywheel units are arranged on the lifting frame. Each flywheel unit comprises a flywheel rotary arranged in a gimbal which is arranged in a gimbal support.

A control unit individually controls the speed and the direction of rotation of the flywheels, and the tilting of the gimbals to create a torque to rotate the lifting frame and any attached load towards a required or predetermined orientation. The control system re-initializes the flywheel units either by reducing the speed of rotation fully or partly, tilting the gimbals to a new starting position, and spinning up the flywheels again, or by stopping the flywheels and spinning up the flywheels in the opposite direction.

One problem with the system of WO 2015/082347 is that a user must wait for re-initialisation of the flywheel units which can cause impractical delays in the lift of the load and can slow progress on a project. Another problem is that the flywheels add significant weight to the lifting frame which must always be lifted by the crane and carry the weight of the load.

OBJECT OF THE INVENTION

It is a preferred object of the present invention to provide an improved system and/or method for controlling the orientation of a suspended load and/or managing materials that addresses or at least ameliorates one or more of the aforementioned problems of the prior art and/or provides a useful commercial alternative.

SUMMARY OF THE INVENTION

The present invention relates to materials management systems and methods and in particular load management systems and methods. In particular, embodiments of the present invention relate to orienting suspended loads via gyroscopic devices and measuring and generating data about the load and their movements.

In one form, although not necessarily the broadest form, the invention resides in a material management method comprising:

receiving, via a processor, data relating to work activities and material flows from one or more sensors;

generating, via the processor, safety and productivity information based on the data relating to work activities and material flows;

comparing, via the processor, the generated safety and productivity information with existing project plans and schedules of the work activities and material flows;

determining, via the processor, a present state and relative progress of the project plans and schedules of work; and generating, via the processor, updated project plans and schedules of work.

The data relating to work activities and material flows may include one or more of at least the following: a location of the material; movement of the material; an identification of the material; rotation of the material.

Suitably, the material is a load and the method comprises controlling a rotation of a suspended load by:

attaching two or more gyroscopic modules directly or indirectly to the suspended load, the two or more gyroscopic modules in communication with the processor in the form of a controller; and independently controlling the two or more gyroscopic modules via the controller to control the rotation of the suspended load.

In another form, although not necessarily the broadest form, the invention resides in a system for controlling a rotation of a suspended load, the system comprising:

two or more gyroscopic modules for attachment directly or indirectly to the suspended load; and a controller to independently control the two or more gyroscopic modules to control the rotation of the suspended load.

Preferably, each gyroscopic module comprises one or more rotors pivotally mounted to one or more gimbals.

Suitably, the system comprises an attachment means for attaching each gyroscopic module to another gyroscopic module, to a load support structure or to the suspended load.

Suitably, the system comprises a load support structure which comprises one or more of the gyroscopic modules.

Suitably, one of the one or more gimbals of each gyroscopic module is pivotally mounted to a casing.

Suitably, each gyroscopic module is mounted to a separate casing.

Suitably, two or more gyroscopic modules are mounted to the same casing.

Suitably, the system comprises a first motor coupled to the rotor of each gyroscopic module and in communication with the controller to control an angular velocity of the rotor to control the rotation of the suspended load.

Suitably, the first motor is located within the rotor.

Suitably, the rotor comprises one or more movable weights to control a moment of inertia of the rotor.

Suitably, the system comprises a second motor coupled to the gimbal of each gyroscopic module and in communication with the controller to control an orientation of the gimbal to control the rotation of the suspended load.

Suitably, the system comprises one or more power supplies to power the first motors and the second motors.

Suitably, one or more of the one or more power supplies is located within the respective gyroscopic module.

Suitably, one or more of the one or more power supplies is located within the rotor of the respective gyroscopic module.

Suitably, one or more of the one or more power supplies is recharged via a wireless charger.

Suitably, the wireless charger is located on a crane that is lifting the load.

Suitably, the system comprises one or more first clutches to enable each first motor to engage or disengage with the respective rotor.

Suitably, the system comprises one or more second clutches to enable each second motor to engage or disengage with the respective gimbal.

Suitably, the system comprises one or more locks to lock the rotation of the gimbal and/or rotor of one or more of the gyroscopic modules.

Suitably, the controller comprises a processor for executing computer readable program code to control the rotation of the load by controlling the two or more gyroscopic modules.

Suitably, the processor executes computer readable program code to control the rotation of the load based on a user input.

Suitably, the controller comprises an input device in communication with the processor for receiving the user input.

Suitably, the input device is a remote controller.

Suitably, at least some of the computer readable program code is executed to control the rotors of two of the gyroscopic modules to be in a momentum wheel configuration during start up of the two of the gyroscopic modules and to change the orientation of the rotors of two of the gyroscopic modules to a second configuration after the rotors are rotating at more than a desired angular speed.

Suitably, at least some of the computer readable program code is executed to control one or more gyroscopic modules for a first part of a rotation of the suspended load and one or more other gyroscopic modules for a second part of the rotation.

Suitably, the gyroscopic modules each comprise one or more sensors in communication with the controller or a processor.

Suitably, one or more of the sensors provide a state of the respective gyroscopic module to the controller.

Suitably, at least some of the computer readable program code is executed to automatically orient the suspended load using data received from the one or more sensors.

Suitably, the controller generates a record of a movement of the suspended load using the data received from the one or more sensors.

Suitably, the gyroscopic module comprises one or more sockets or recesses to receive one or more sensor modules comprising one or more of the sensors.

Suitably, the system comprises an indicator to display a maximum torque, angular kinetic energy and/or momentum impartible to the load by the gyroscopic modules.

The system may comprise one or more of the following connectable directly or indirectly to the controller: one or more photovoltaic cells; one or more loudspeakers; one or more display screens.

In another form, although not necessarily the broadest form, the invention resides in a method of controlling a rotation of a suspended load, the method comprising:

attaching two or more gyroscopic modules directly or indirectly to the suspended load; and independently controlling the two or more gyroscopic modules via a controller to control the rotation of the suspended load.

Suitably, controlling the two or more gyroscopic modules comprises controlling an angular velocity of a rotor of one or more of the gyroscopic modules via the controller.

Suitably, controlling the two or more gyroscopic modules comprises controlling an orientation of the rotor of one or more of the gyroscopic modules via the controller.

Suitably, the two or more gyroscopic modules are controlled via the controller to impart a moment to the suspended load.

Suitably, the two or more gyroscopic modules are controlled via the controller to maintain an orientation of the suspended load.

Suitably, controlling the two or more gyroscopic modules comprises locking an orientation of the rotor of one or more of the gyroscopic modules.

Suitably, controlling the two or more gyroscopic modules comprises controlling the rotation of the suspended load by controlling an angular velocity of the rotor of one or more of the gyroscopic modules during a start up of the gyroscopic modules.

Suitably, controlling the two or more gyroscopic modules comprises controlling the rotation of the suspended load by controlling the orientation of the rotor of one or more of the gyroscopic modules after the rotors are rotating at more than a desired angular speed.

Suitably, controlling the two or more gyroscopic modules comprises orienting the rotors of two of the gyroscopic modules in a momentum wheel configuration during start up of the two of the gyroscopic modules and changing the orientation of the rotors of two of the gyroscopic modules to a second configuration after the rotors are rotating at more than a desired angular speed.

Suitably, controlling the two or more gyroscopic modules comprises controlling the rotors of two of the gyroscopic modules to rotate in a common direction.

Suitably, controlling the two or more gyroscopic modules comprises controlling the rotors of two of the gyroscopic modules to rotate in opposite directions.

In a further form, although not necessarily the broadest form, the invention resides in a method of controlling a rotation of a suspended load via two or more gyroscopic modules that are coupled directly or indirectly to the suspended load, the method comprising:

controlling a first part of a rotation of the suspended load via one or more of the two or more gyroscopic modules; and controlling a second part of the rotation of the suspended load via a different one or more of the two or more gyroscopic modules.

In yet another form, although not necessarily the broadest form, the invention resides in a load management system comprising a processor in communication with one or more sensors of one or more gyroscopic units that are coupled directly or indirectly to a suspended load, wherein the processor automatically updates one or more planned work schedules based on data from the one or more sensors.

In another form, although not necessarily the broadest form, the invention resides in a load management system comprising a processor in communication with one or more sensors of one or more gyroscopic units that are coupled directly or indirectly to a suspended load, wherein the processor automatically displays details of the load and/or its movements via one or more monitoring systems based on data from the one or more sensors.

In another form, although not necessarily the broadest form, the invention resides in a load recognition method comprising:

receiving, via a processor, details of a load from one or more sensors; and comparing, via the processor, the details from the one or more sensors with one or more load identifiers to identify the load.

In another form, although not necessarily the broadest form, the invention resides in a scheduling method comprising:

receiving, via a processor, details of a load from one or more sensors;

determining, via the processor, a location and/or movement of the load based on the details of a load from the one or more sensors; and updating one or more planned work schedules based on the location and/or movement of the load.

In another form, although not necessarily the broadest form, the invention resides in a monitoring method comprising:

receiving, via a processor, details of a load from one or more sensors;

determining, via the processor, based on the details of the load from one or more sensors, a location and/or a movement of the load; and displaying via one or more monitoring systems the location and/or the movement of the load.

In another form, although not necessarily the broadest form, the invention resides in a load management method comprising:

receiving, via a processor, details of a load and a surrounding environment from one or more sensors;

generating, via the processor, a three dimensional map of the surrounding environment based on the details of the load and the surrounding environment;

comparing, via the processor, a location and/or rotation of the load with the map of the surrounding environment; and determining, via the processor, a safe movement for the load.

Further forms and/or features of the present invention will become apparent from the following detailed description.

BRIEF DESCRIPTION OF THE DRAWINGS

In order that the invention may be readily understood and put into practical effect, reference will now be made to preferred embodiments of the present invention with reference to the accompanying drawings, wherein like reference numbers refer to identical elements. The drawings are provided by way of example only, wherein:

FIG. 1 is a schematic diagram of a system for controlling a rotation of a suspended load according to one embodiment of the invention;

FIG. 2 is a plan view of a gyroscopic module according to one embodiment of the invention;

FIG. 3 is a front cross-sectional view of the gyroscopic module shown in FIG. 2;

Figure 4:
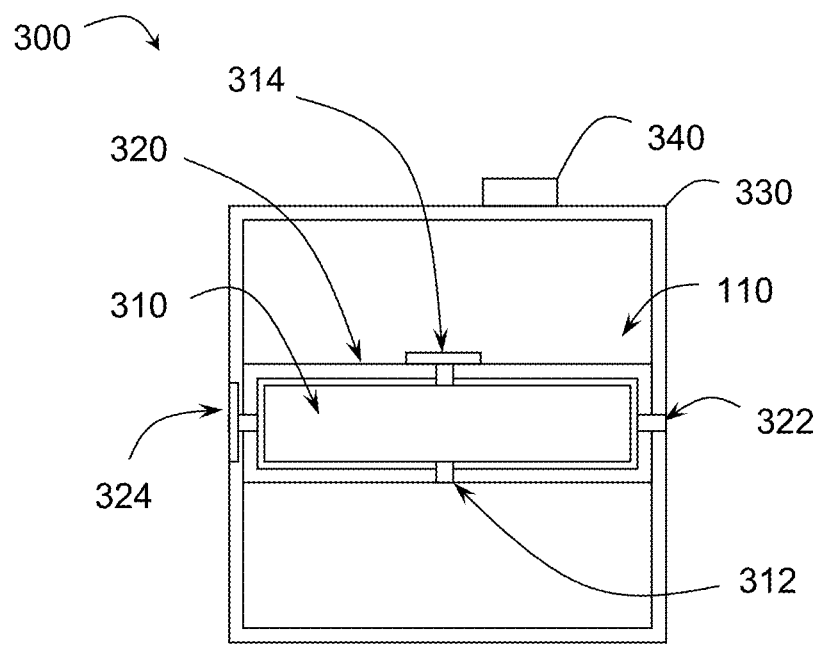
FIG. 4 is a plan view of a gyroscopic unit in accordance with one embodiment of the invention.

Skilled addressees will appreciate that elements in the drawings are illustrated for simplicity and clarity and have not necessarily been drawn to scale. For example, the relative dimensions of some of the elements in the drawings may be distorted to help improve understanding of embodiments of the present invention.

DETAILED DESCRIPTION OF THE INVENTION

The present invention relates to materials management systems and methods, and in particular load management systems and methods. In particular, the present invention relates to orienting suspended loads via gyroscopic devices and measuring and generating data about the load and its movements.

FIG. 1 is a schematic diagram of a system 100 for controlling a rotation of a suspended load according to one embodiment of the invention. The system 100 comprises two or more gyroscopic modules 110 for attachment directly or indirectly to the suspended load. For example, one or more of the gyroscopic modules 110 can be attached directly to the suspended load via an attachment means, such as, a bolt, a clamp or a chain. For example, one or more of the gyroscopic modules 110 can be attached indirectly to the suspended load by attaching them to a load support structure or by attaching them to another gyroscopic module 110 that is attached directly or indirectly to the suspended load. In some embodiments, one or more of the gyroscopic modules 110 form part of the load support structure. Four gyroscopic modules are shown in the example in FIG. 1 and labelled 110A, 110B, 110C and 110D.

The system 100 also comprises a controller 120 in communication with the two or more gyroscopic modules 110 to independently control the two or more gyroscopic modules 110 to control the rotation of the suspended load. The controller 120 can, for example, form part of one of the gyroscopic modules 110 or be located remote from the gyroscopic modules 110.

FIG. 2 is a plan view of a gyroscopic module 110 according to one embodiment of the invention, and FIG. 3 is a front cross-sectional view of the gyroscopic module 110 shown in FIG. 2. The gyroscopic module 110 comprises a rotor 310 pivotally mounted to a gimbal 320 via a first axle 312. The gimbal 320 is pivotally mounted, for example, to a casing 330, via a second axle 322.

In embodiments of the invention, an angular velocity and/or an orientation of the rotor 310 is independently controlled by the controller 120 for each gyroscopic module 110 to control an orientation of a suspended load. In some embodiments, one or more of the gyroscopic modules 110 comprise more than one gimbal, for example, to enable reorientation of the rotor 310 in additional dimensions. In some embodiments, a gyroscopic unit is provided comprising one or more gyroscopic modules and one or more other features described herein. A skilled addressee will appreciate that while example gyroscopic units are described hereinafter and shown in the figures, a gyroscopic unit according to embodiments of the invention can include any combination of the features of these gyroscopic units and is not limited to the combinations shown.

Figure 5:
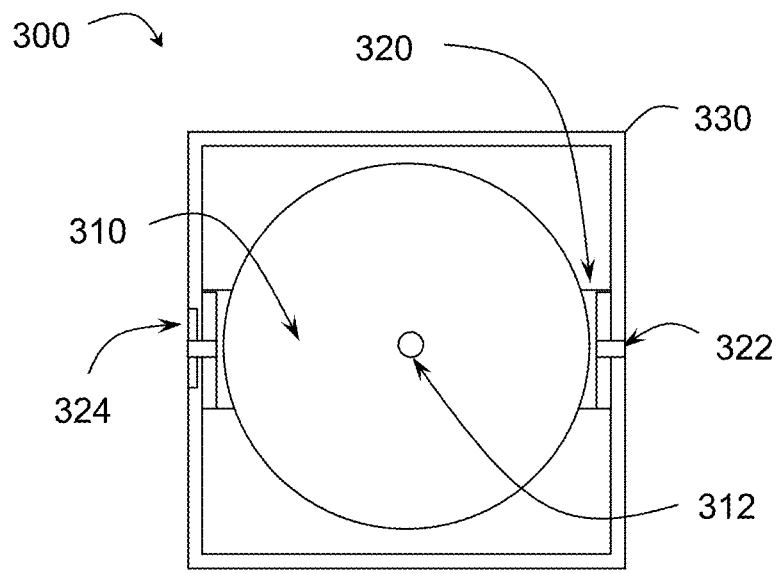
FIG. 5 is a front cross-sectional view of the gyroscopic unit shown in FIG. 4.

FIG. 4 is a plan view of a gyroscopic unit 300 in accordance with one embodiment of the invention. FIG. 5 is a front cross-sectional view of the gyroscopic unit 300 shown in FIG. 4. The gyroscopic unit 300 comprises the gyroscopic module 110 mounted to the casing 330. In some embodiments, the gyroscopic module 110 and the casing 330 can form a compact and self-contained unit.

The gimbal 320 is pivotally mounted to the casing 330 via the second axle 322. A first motor 314 is coupled to the rotor 310 to control an angular velocity of the rotor 310. The first motor 314 is in communication with the controller 120 to enable the controller 120 to control the angular velocity of the rotor 310 to control the rotation of the suspended load. A second motor 324 is coupled to the gimbal 320 to control an orientation of the gimbal 320 and hence the rotor 310. The second motor 324 is in communication with the controller 120 to enable the controller 120 to control the orientation of the gimbal 320 to control the rotation of the suspended load. The first motor 314 and/or the second motor 324 can be a servomotor, for example, to enable accurate control of the orientation and/or angular velocity of the rotor 310 and provide a current orientation and/or angular velocity of the rotor to the controller 120. In some embodiments, the first motor 314 forms part of the rotor 310. For example, the motor can be a pancake motor, an out-runner motor, an in-runner motor or another motor that is suitable for use within the rotor 310. Including the first motor 314 in the rotor 310 can reduce the overall weight of the gyroscopic module 110.

In some embodiments, the first motor 314 provides regenerative braking, for example, to recharge a power source, such as a battery, when the rotor 310 or the gimbal 320 is decelerated. In some embodiments, the first motor 314 transfers energy to another first motor 314, for example, mechanically or electrically, when the rotor 310 or the gimbal 320 is decelerated.

An attachment means 340 can be provided for attaching the gyroscopic module 110 directly or indirectly to the suspended load via the casing 330. For example, the attachment means 340 can be any known type of attachment device, such as a quick attachment device, and the gyroscopic module 110 can be attached via the attachment means 340 to another gyroscopic module, to a load support structure or to the suspended load. In some embodiments, an attachment means is provided on more than one side of the gyroscopic module 110, such that gyroscopic modules 110 can be stacked, for example, in a vertical, longitudinal and/or lateral direction. It will be appreciated that such a quick attachment device can also function as a quick release device.

Figure 6:
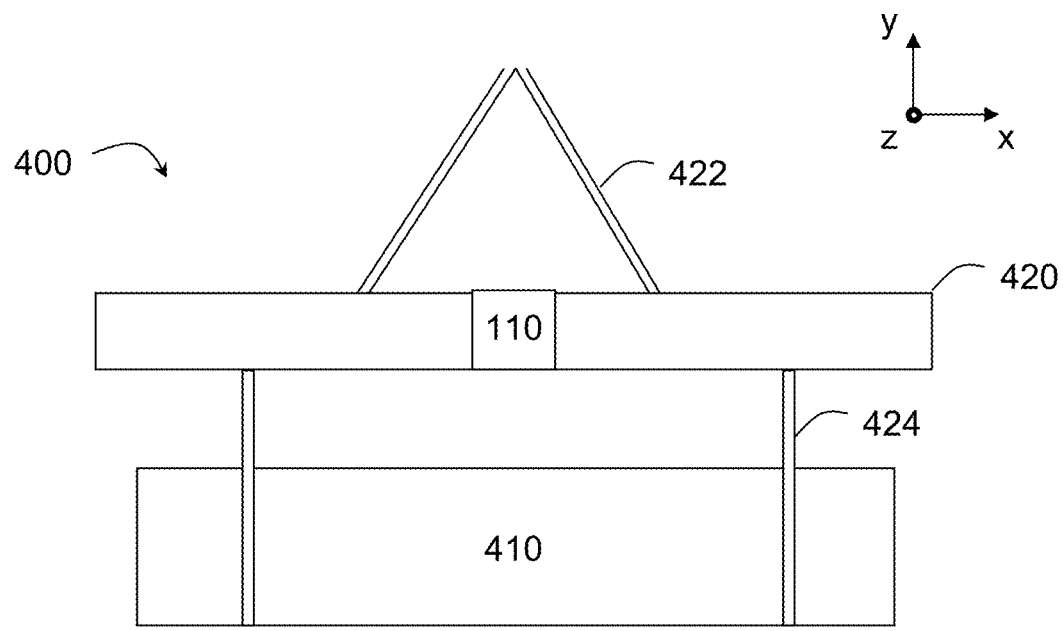
FIG. 6 is a front view of two gyroscopic modules attached to a load system according to one embodiment of the invention.
Figure 7:
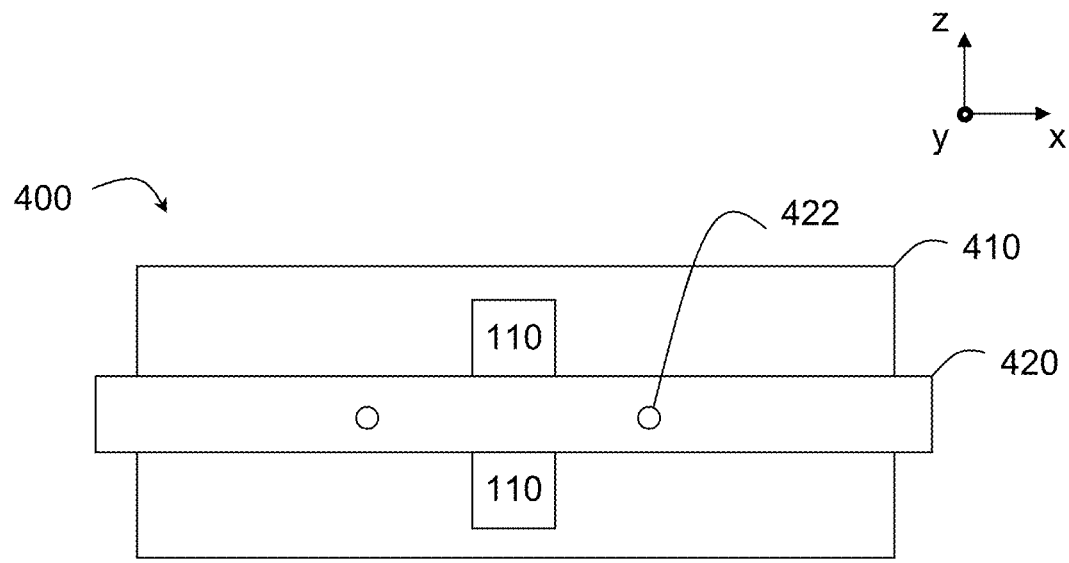
FIG. 7 is a plan view of the two gyroscopic modules attached to the load system shown in FIG. 6.

FIG. 6 is a front view of two gyroscopic modules 110 attached to a load system 400 according to one embodiment of the invention. FIG. 7 is a plan view of the two gyroscopic modules 110 attached to the load system 400 shown in FIG. 6.

The load system 400 comprises a load support structure 420 which supports a load 410 via cables 424. The load support structure 420 is suspended from a crane via cables 422. The two gyroscopic modules 110 are attached to the load support structure 420. In some embodiments, mounting points are provided on the load support structure 420 to which the gyroscopic modules 110 can be attached.

The gyroscopic modules 110 are shown to be attached on either side of the load support structure 420 midway along the load support structure 420. However, as stated above, the gyroscopic modules 110 can be attached at any point on the load support structure 420 or the load 410 or form part of the load support structure 420. In some embodiments, one or more of the gyroscopic modules 110 form part of the load support structure 420. For example, one or more gyroscopic modules 110 are integrated into a load support beam.

A configuration of a gyroscopic module 110 where a rotation of a suspended load 410 is controlled by controlling the angular velocity of the rotor is referred to hereinafter as a momentum wheel configuration. In a momentum wheel configuration, a change in the angular velocity of the rotor 310 imparts a torque to the suspended load in the same plane of rotation as the rotor. For example, the rotation about a y-axis of the suspended load 410 in FIGS. 6 and 7 can be controlled by controlling an angular velocity of the rotor 310 of one or both of the gyroscopic modules 110, as necessary.

Figure 8:
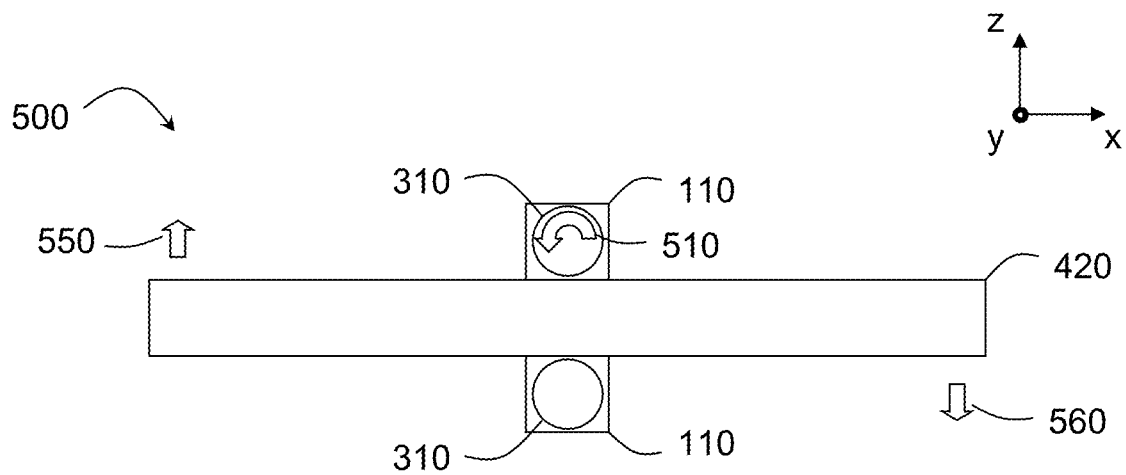
FIG. 8 is a plan view of a momentum wheel configuration of the two gyroscopic modules on the load system shown in FIGS. 6 and 7.

FIG. 8 is a plan view of a momentum wheel configuration 500 of the two gyroscopic modules 110 on the load system 400 shown in FIGS. 6 and 7. In the momentum wheel configuration 500, the rotors 310 of the two gyroscopic modules 110 are rotatable about a y-axis, i.e. in an x-z plane of rotation.

One of the rotors 310 is accelerated in a positive direction about the y-axis, as shown by arrow 510. The rotor 310 is accelerated by applying a torque to the load support structure 420, for example, via the motor 314, in a negative direction about the y-axis as shown by arrow 550 and arrow 560. This torque is transferred from the load support structure 420 to the load 410.

Figure 9:
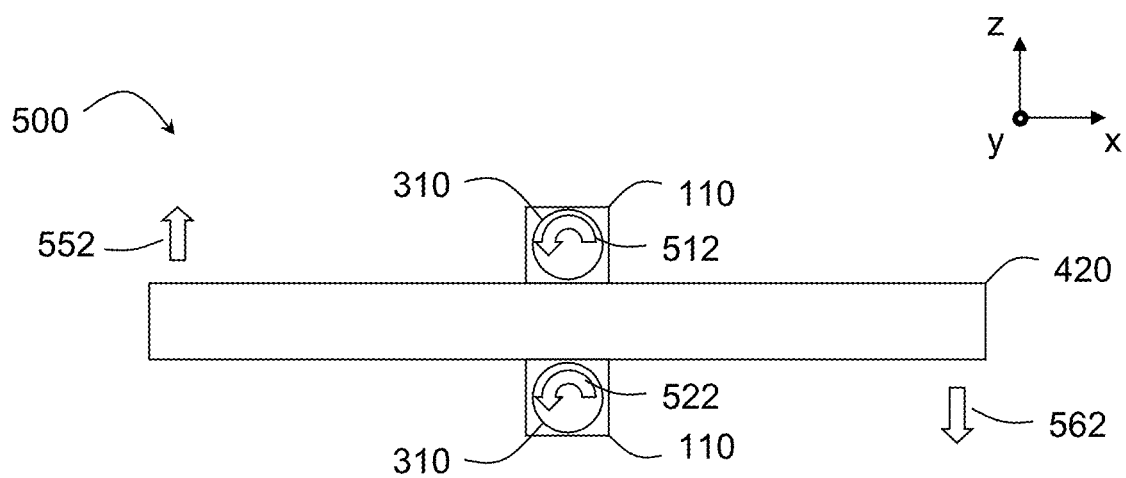
FIG. 9 is a plan view of the momentum wheel configuration showing the acceleration of the rotors of the two gyroscopic modules in the positive direction about a y-axis.

FIG. 9 is a plan view of the momentum wheel configuration 500 showing the acceleration of the rotors of the two gyroscopic modules 110 in the positive direction about the y-axis, as shown by arrow 512 and arrow 522. The rotors 310 are each accelerated by applying a torque to the load support structure 420, for example, via the motor 314, in a negative direction about the y-axis. Because both rotors 310 are accelerated by inducing a torque in the same direction about the y-axis, the torques add such that a greater net torque can be applied to the load support structure 420, and hence the load 410. The net torque applied to the load support structure 420 is shown by arrow 552 and arrow 562.

Figure 10:
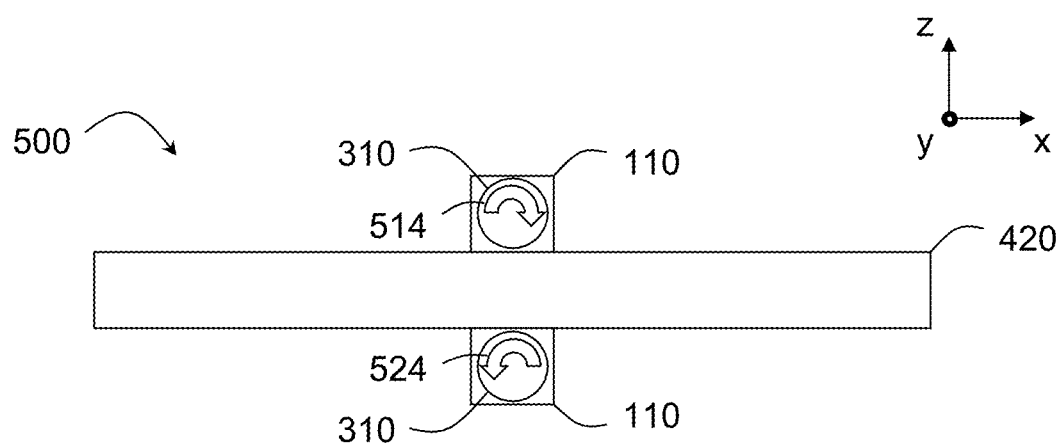
FIG. 10 is a plan view of the momentum wheel configuration showing the acceleration of the two gyroscopic modules in opposite directions about the y-axis.

FIG. 10 is a plan view of the momentum wheel configuration 500 showing the acceleration of the two gyroscopic modules in opposite directions about the y-axis.

A first one of the rotors 310 is accelerated in a negative direction about the y-axis, as shown by arrow 514. The first one of the rotors 310 is accelerated by applying a torque to the load support structure 420, for example, via the motor 314, in a positive direction about the y-axis. A second one of the rotors 310 is accelerated in a positive direction about the y-axis, as shown by arrow 524. The second one of the rotors 310 is accelerated by applying a torque to the load support structure 420, for example, via the motor 314.

Because the rotors 310 are accelerated by inducing torques in opposite directions about the y-axis, the torques oppose one another. In one example, the rotors 310 are accelerated such that an equal and opposite torque is applied to the load support structure 420 by each gyroscopic module 110. In such a way, two gyroscopic modules can be accelerated in the momentum wheel configuration without accelerating the load support structure 420 or the load 410.

Figure 11:
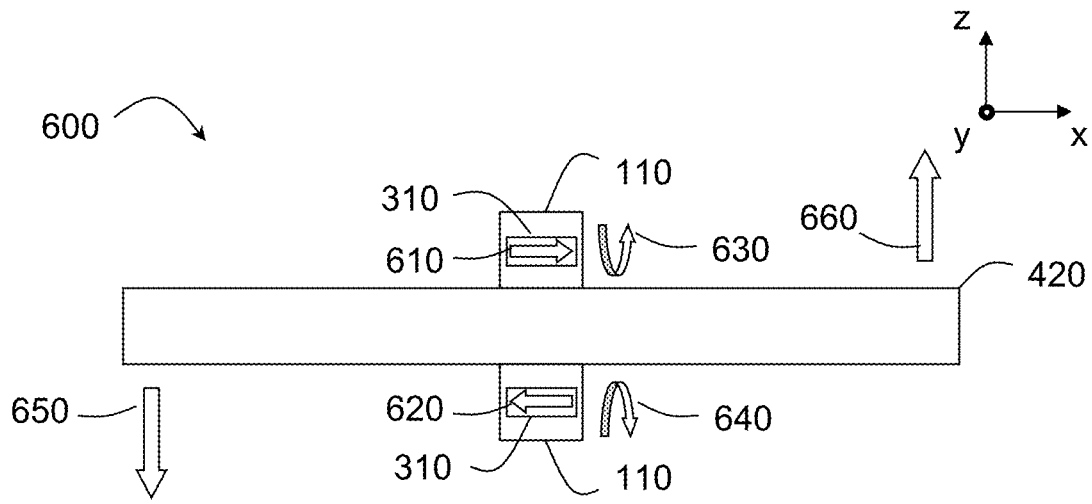
FIG. 11 is a plan view of a second configuration of the two gyroscopic modules on the load system shown in FIGS. 6 and 7, wherein the rotors of the gyroscopic modules rotate in opposite directions about a z-axis.

FIG. 11 is a plan view of a second configuration 600 of the two gyroscopic modules 110 on the load system 400 shown in FIGS. 6 and 7. In the second configuration 600, the rotors 310 of the gyroscopic modules 110 rotate in opposite directions about a z-axis, i.e. in an x-y plane of rotation, as shown by arrow 610 and arrow 620.

A rotation of the suspended load 420 can be controlled via the gyroscopic modules 110 by controlling an orientation of the rotor 310 of one or both of the gyroscopic modules 110, for example, via the second motor 324. Arrow 630 and arrow 640 illustrate an example change in the orientation of the rotors 310 of the two gyroscopic modules 110 about an x-axis, i.e. in a y-z plane of rotation, to reach the second configuration 600 from the momentum wheel configuration 500. Arrow 650 and arrow 660 illustrate a torque applied to the load support structure 420 by the change in orientation of the rotors 310, where the rotors 310 were initially rotating in the positive direction about the y-axis.

The momentum transferred from the rotors to the load support structure 420 can be determined by considering the change in momentum of the rotors 310. For example, a first of the rotors 310 has an angular momentum (L) initially about the y-axis and finally about the z-axis. The first one of the rotors 310 initially rotates in a positive direction about the y-axis with an angular momentum of $L_1Y$ and changes orientation to rotate in a positive direction about the z-axis with an angular momentum of $L_2Z$. The change in angular momentum of the first one of the rotors 310 is therefore calculated to be $L_2Z-L_1Y$. The second one of the rotors 310 initially rotates in a positive direction about the y-axis with an angular momentum of $L_3Y$ and changes orientation to rotate in a negative direction about the z-axis with an angular momentum of $-L_4Z$. The change in angular momentum of the second one of the rotors 310 is therefore calculated to be $-L_4Z-L_3Y$. Hence, the total change in angular momentum of the rotors 310 is calculated to be $(L_2-L_4)Z-(L_1+L_3)Y$ and the total momentum transferred to the load support structure 420 is calculated to be $(L_4-L_2)Z+(L_1+L_3)Y$.

Where the magnitude of angular momentum of each rotor 310 is equal, $L_2=L_4$ and the therefore $L_4-L_2=0$. Hence, no net angular momentum is induced about the z-axis in the load support structure 420 and unwanted changes in momentum about the z-axis are mitigated. Because $L_1=L_3$ and therefore $L_1+L_3=2L_1$, twice the momentum of a single rotor 310 is transferred to the load support structure 420, and hence the load 410, about the y-axis. That is, the momentum transferred to the load 410 is $2L_1Y$.

If the gimbals are rotated further such that the rotors 310 have changed orientation by 180 degrees and rotate in a negative direction about the y-axis, another $2L_1Y$ of momentum will be transferred to the load 410 and the total momentum transferred to the load 410 will be 4L1Y.

If the gimbals are rotated back to the momentum wheel configuration 500 from the second configuration 600, in opposite directions, a further momentum of $-2L1Y$ will be transferred to the load 410. If the orientation of the rotors 310 is changed in a common direction from the second configuration 600 to the momentum wheel configuration 500 or beyond, an equal and opposite momentum is transferred to the load support structure 420 from each rotor 310 and therefore no further change in momentum will be induced in the load support structure 420.

In the second configuration 600, the gimbals 320 of the gyroscopic modules 110 can be locked, for example via locks, to prevent the orientation of the rotors 310 from changing relative to the load support structure 420. With the gimbals 320 locked, the gyroscopic modules 110 provide no net resistance to rotation of the load support structure 420, or the load 410, about the y-axis. This is referred to hereinafter as a "freewheel configuration".

In particular, a freewheel configuration is achieved if equal and opposite torques are induced in the load support structure 420 by each gyroscopic module 110 when the load support structure 420 is rotated. For example, a freewheel configuration can be achieved when the rotors 310 of the gyroscopic modules 110 have the same magnitude of angular momentum about the z-axis but in opposing directions.

In some embodiments, the rotors 310 are accelerated from rest in the second configuration 600. For example, a substantially equal torque is applied to each rotor 310 in an opposite direction about the z-axis such that no net torque is applied to the load support structure 420 when accelerating the rotors 310 from rest.

Figure 12:
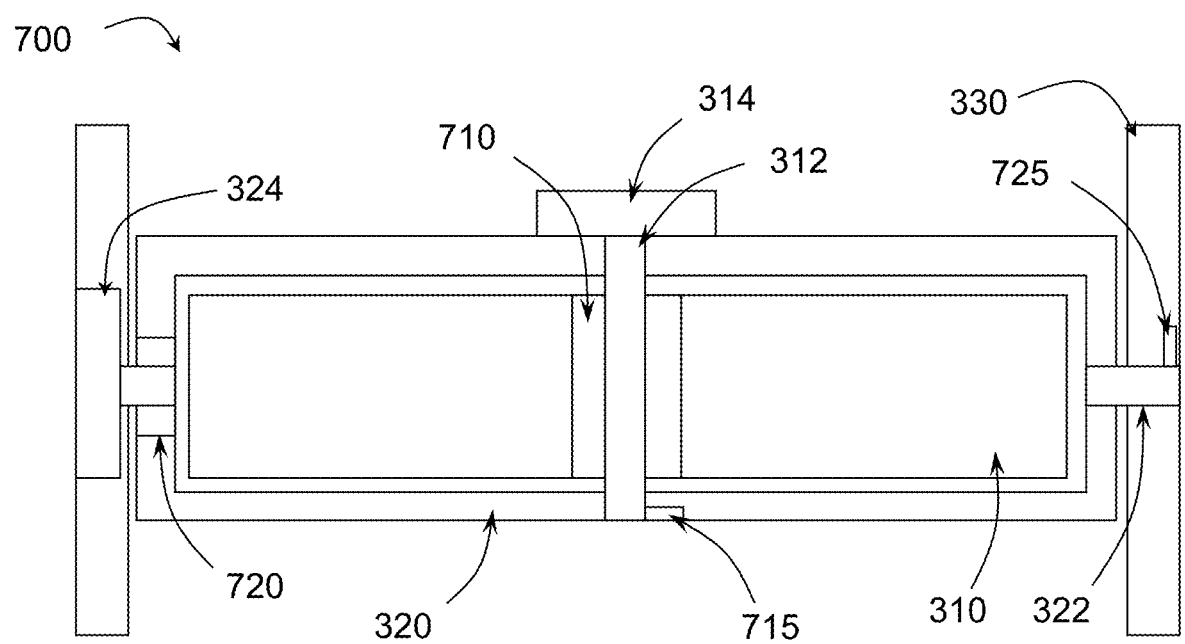
FIG. 12 is a cross-sectional view of a gyroscopic unit according to one embodiment of the invention.

FIG. 12 is a cross-sectional view of a gyroscopic unit 700 according to one embodiment of the invention. The gyroscopic unit 700 comprises a rotor clutch 710 and a gimbal clutch 720. The rotor clutch 710 enables the first motor 314 to engage and disengage with the rotor 310. The gimbal clutch 720 enables the second motor 324 to engage and disengage with the gimbal 320.

In some embodiments, the controller controls the orientation of the suspended load via the rotor clutch 710 and/or the gimbal clutch 720 by enabling the rotor 310 and/or the gimbal 320 to rotate freely. In some embodiments, the controller 120 disengages the rotor clutch 710 and/or the gimbal clutch 720 such that the momentum in the rotor 310 can dissipate, for example, via air resistance, without imparting a torque to the load 410.

The gyroscopic unit 700 also comprises a rotor lock 715 and a gimbal lock 725. The rotor lock 715 locks the rotation of the rotor 310 and the gimbal lock 725 locks the orientation of the gimbal 320. In some embodiments, the controller 120 controls the orientation of the suspended load by locking an orientation of the rotor 310 of one or more gyroscopic modules 110 via the gimbal lock 725 and/or locking the rotation of the rotor 310 of one or more gyroscopic modules 110 via the rotor lock 715.

Because the momentum that can be imparted to the load support structure 420 is limited additional gyroscopic modules 110 or pairs of gyroscopic modules 110 can be attached directly or indirectly to the load 410.

Figure 13:
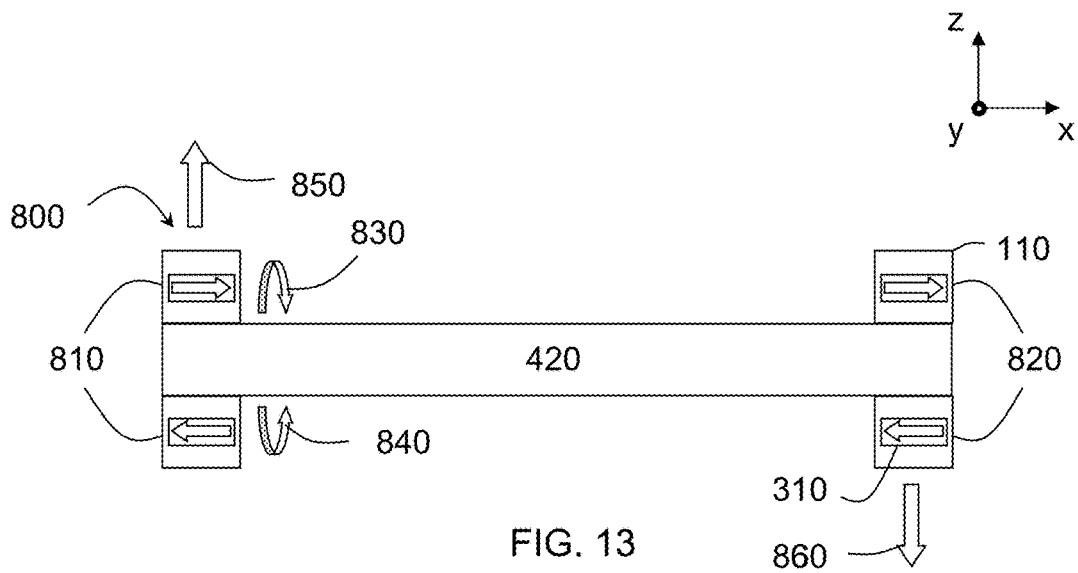
FIG. 13 is a plan view of a third configuration according to one embodiment of the invention.

FIG. 13 is a plan view of a third configuration 800 according to one embodiment of the invention. In the third configuration 800, four gyroscopic modules 110 are attached to the load system shown in FIGS. 6 and 7.

The four gyroscopic modules 110 can be configured as a first set 810 of gyroscopic modules 110 and a second set 820 of gyroscopic modules 110. Each set of gyroscopic modules 110 comprises two gyroscopic modules 110 rotating in opposite directions. The orientation of the rotors 310 of the first set 810 of gyroscopic modules 110 is changed in opposing directions about the x-axis, as shown by arrow 830 and arrow 840. This induces a torque in the load support structure 420 in a negative direction about the y-axis, as shown by arrow 850 and arrow 860.

The second set 820 of gyroscopic modules 110 can be configured in a freewheel configuration, for example, by locking the gimbals 320 of each gyroscopic module 110, for example, via the gimbal lock 725, such that the second set 820 of gyroscopic modules 110 does not resist the rotation of the load support structure 420. Alternatively, the orientation of the rotors 310 of the second set 820 of gyroscopic modules 110 can also be changed in opposing directions about the x-axis to provide additional torque, or the second set 820 of gyroscopic modules 110 can be disengaged from the second motor 324 such that the rotors 310 of each gyroscopic module 110 can change orientation freely to resist rotation of the load support structure 420.

When the four gyroscopic modules 110 are disengaged from the second motor 324 such that they can change orientation freely, the four gyroscopic modules mitigate changes in the orientation of the load 410 better than two gyroscopic modules 110, for example, by providing added resistance to changes in orientation of the load 410. Both sets of gyroscopic modules 110 in the third configuration 800 can also be locked in a freewheel configuration to enable the load support structure 420 to be rotated about the y-axis without the gyroscopic modules 110 providing a net resistance to the rotation.

Figure 14:
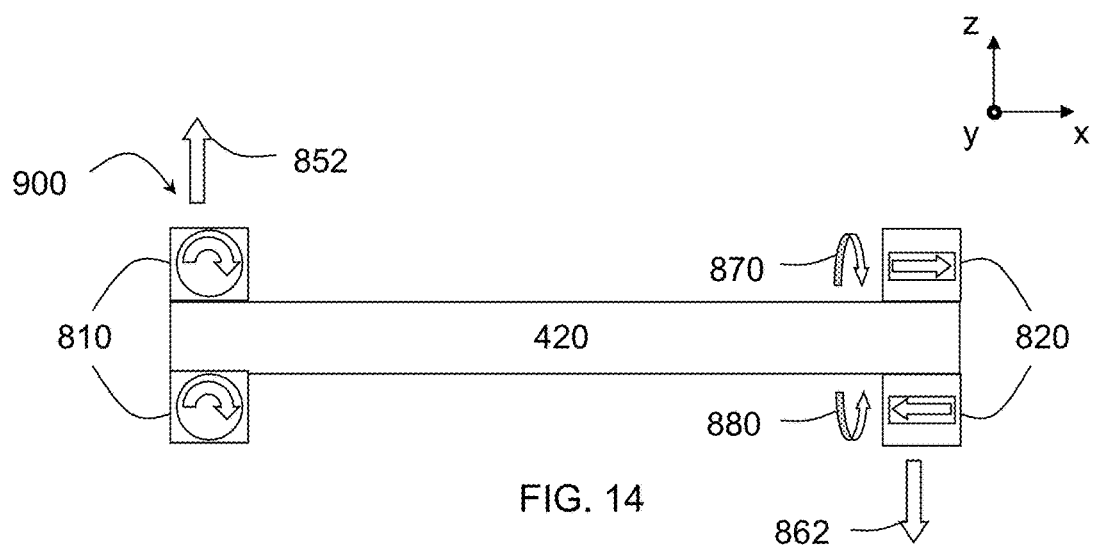
FIG. 14 is a plan view of a fourth configuration according to one embodiment of the invention.

FIG. 14 is a plan view of a fourth configuration 900 according to one embodiment of the invention. In the fourth configuration 800, four gyroscopic modules 110 are attached to the load system shown in FIGS. 6 and 7. The first set 810 of gyroscopic modules 110 is in the momentum wheel configuration 500 and the second set 820 of gyroscopic modules 110 is in the second configuration 600. The fourth configuration 900 can be reached from the third configuration 800 by changing the orientation of the gimbals 320 of the first set 810 of gyroscopic modules 110 as shown in FIG. 13.

The orientation of the rotors 310 of the second set 820 of gyroscopic modules 110 is changed in opposing directions about the x-axis, as shown by arrow 870 and arrow 880. This induces a torque in the load support structure 420 in a negative direction about the y-axis, as shown by arrow 852 and arrow 862. Therefore, the second set 810 of gyroscopic modules 110 can be used to produce additional torque of the load support structure 420 about the y-axis, for example, once the first set 820 of gyroscopic modules 110 can produce no further torque in a given direction.

Figure 15:
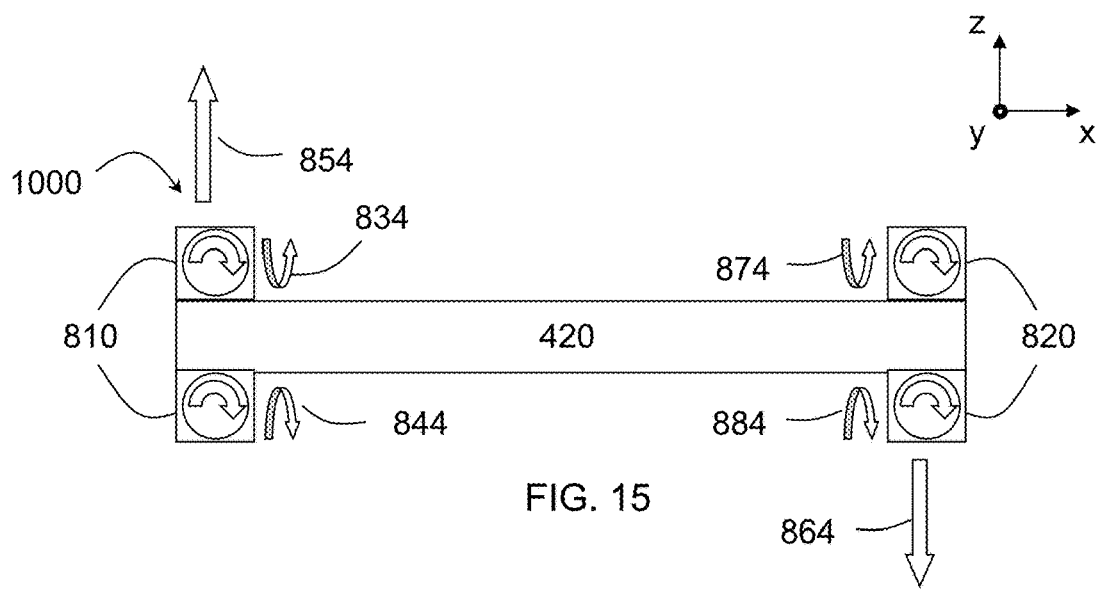
FIG. 15 is a plan view of a fifth configuration according to one embodiment of the invention.

FIG. 15 is a plan view of a fifth configuration 1000 according to one embodiment of the invention. In the fifth configuration 1000, four gyroscopic modules 110 are attached to the load system shown in FIGS. 6 and 7. The first set 810 and the second set 820 of gyroscopic modules 110 are in the momentum wheel configuration 500 with the rotors rotating in a negative direction about the y-axis. The fifth configuration 1000 can be reached from the third configuration 800 by changing the orientation of the gimbals 320 of the second set 820 of gyroscopic modules 110 as shown in FIG. 14.

In the fifth configuration 1000, the gyroscopic modules 110 can each induce a momentum in the load support structure 420 of up to magnitude 2L about the y-axis by changing the orientation of the rotor 310 by 180 degrees. Arrow 834, arrow 844, arrow 874 and arrow 884 show a change in orientation of the gyroscopic modules 110 that induces a torque shown by arrow 854 and arrow 856. Therefore, if each gyroscopic module 110 has a momentum of L, the four gyroscopic modules 110 can impart a maximum net momentum of 8L to the load support structure 420.

By starting each gyroscopic module 110 in the momentum wheel configuration with a momentum of L and rotating each of the gyroscopic modules 110 simultaneously, a greater torque can be induced in the load support structure 420 and for a greater duration.

While configurations have been shown with two or four gyroscopic modules 110, any number of gyroscopic modules 110 can be used to achieve a desired maximum torque. In preferred embodiments, the gyroscopic modules are arranged such that the load 410 and/or the load support structure 420 are balanced. For example, the gyroscopic modules 110 are attached in a balanced or symmetrical configuration relative to the centre of gravity of the load 410 and/or the load support structure 420. In preferred embodiments, the rotors 310 of the gyroscopic modules 110 are reoriented symmetrically in groups of two or more gyroscopic modules 110, such that a torque is imparted to the load 410 about the y-axis while unwanted pitch of the beam about the z-axis and roll of the beam about the x-axis are mitigated.

Figure 16:
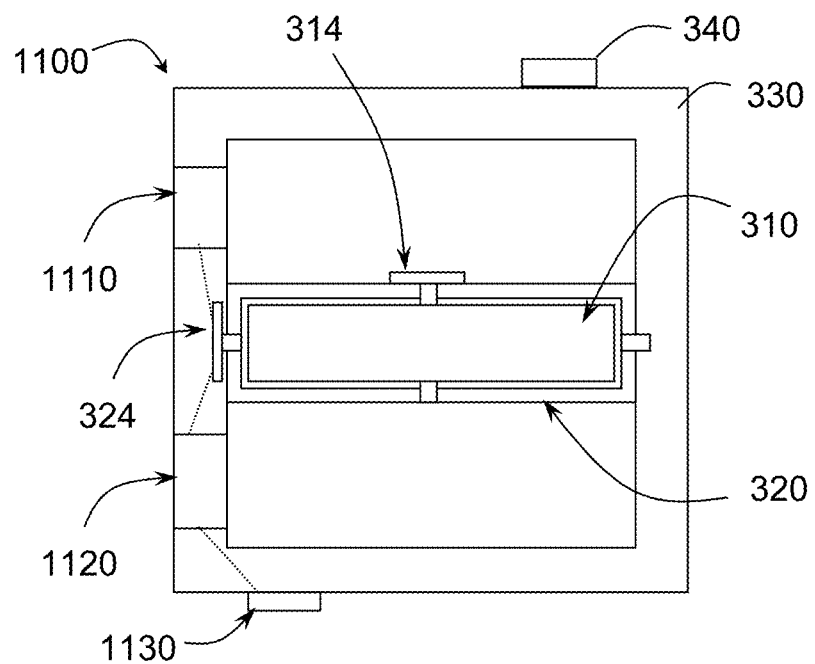
FIG. 16 is a plan view of a gyroscopic unit according to one embodiment of the invention.

FIG. 16 is a plan view of a gyroscopic unit 1100 according to one embodiment of the invention. The gyroscopic unit 1100 comprises a gyroscopic module 110 including a rotor 310 and a gimbal 320, a casing 330, an attachment means 340, a first motor 314 and a second motor 324, as previously described.

The gyroscopic unit 1100 also comprises a controller 1120. The controller 1120 can be, for example, the controller 120 or a device which enables the gyroscopic unit 1100 to communicate with the controller 120. The controller 1120 controls the first motor 314 and/or the second motor 324 to control the rotation of a suspended load.

The gyroscopic unit 1100 comprises a power supply 1110 connected to the first motor 314, the second motor 324 and the controller 1120 to power the first motor 314, the second motor 324 and the controller 1120. The power supply 1110 is located within the gyroscopic unit 1100, for example, in a section of the casing 330 of the gyroscopic unit 1100 where it will not impede the rotor 310. In some embodiments, the power supply 1110 is located within the rotor 310 of the gyroscopic module 110. Hence, a lighter gyroscopic unit 1100 can be constructed for a set weight of the rotor 310.

The gyroscopic unit 1100 comprises one or more sensors 1130 in communication with the controller 1120 to provide a state of the gyroscopic module 110. The one or more sensors 1130 can include, for example, a camera, a location sensor such as a global positioning system (GPS) client and/or an altitude sensor, and/or a rotation sensor such as an accelerometer. The controller 1120 can, for example, automatically orient the suspended load 410, for example, to a predetermined orientation, using data received from the one or more sensors 1130 and/or use the data received from the one or more sensors 1130 to generate a record of a movement of the suspended load 410. In some embodiments, the one or more sensors 1130 include an orientation sensor to measure an orientation of the rotor 310 and/or an angular velocity sensor to measure an angular velocity of the rotor 310 of each gyroscopic module 110. For example, the orientation sensor and/or the angular velocity sensor can form part of the first motor 314 and/or the second motor 324.

Figure 17:
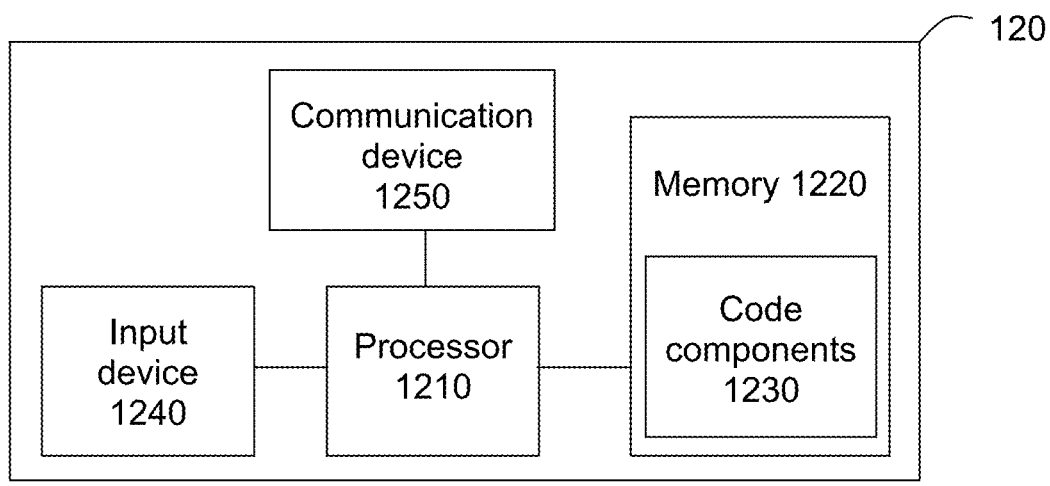
FIG. 17 is a schematic diagram of a controller for controlling the gyroscopic modules according to one embodiment of the invention.

FIG. 17 is a schematic diagram of a controller 120 for controlling the gyroscopic modules 110 according to one embodiment of the invention. The controller 120 comprises a processor 1210 and a memory 1220. The memory 1220 comprises computer readable program code 1230 which can be executed by the processor 1210 to perform various aspects of the invention described herein. For example, the processor 1210 can execute computer readable program code 1230 to control the rotation of the load by controlling the two or more gyroscopic modules 1210.

In some embodiments, the processor 1210 executes computer readable program code 1230 to control the rotation of the load based on an input. The controller 120, shown in FIG. 17, comprises an input device 1240 in communication with the processor 1210 for receiving the input, for example from a user, such as a crane driver or ground based user. However, in some embodiments, the input device 1240 is a remote controller. The controller 120, shown in FIG. 17, also comprises a communication device 1250 for communicating with the gyroscopic modules 110 and other devices.

In some embodiments, the processor 1210 executes computer readable program code 1230 to calculate a maximum torque, angular kinetic energy and/or momentum that can be induced in either direction about the y-axis by the gyroscopic modules 110 and display the maximum possible torque, angular kinetic energy and/or momentum to a user via an indicator. The indicator can be, for example, a light, a display or a scale and can be provided, for example, to a crane operator on an input device or remote controller. In some embodiments, the processor 1210 executes computer readable program code 1230 to determine whether the maximum torque, angular kinetic energy and/or momentum is below a threshold torque, threshold angular kinetic energy and/or threshold momentum and to display a warning light, for example, to the crane operator, if the maximum torque, angular kinetic energy and/or momentum is below the threshold.

Figure 18:
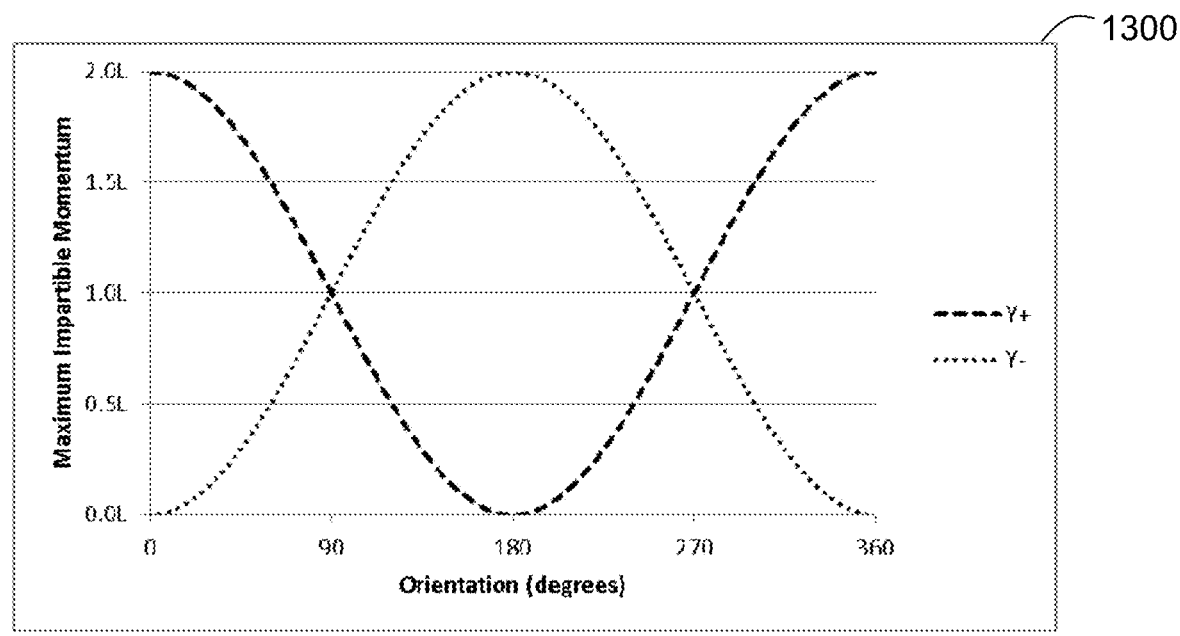
FIG. 18 illustrates an example graph of a maximum momentum impartible to the load by changing an orientation of a rotor of a gyroscopic module versus the orientation of the rotor of the gyroscopic module.

In some embodiments, the maximum torque, angular kinetic energy and/or momentum that can be induced is calculated based on the measured orientation and angular velocity of each gyroscopic module 110. FIG. 18 illustrates an example graph 1300 of a maximum angular momentum impartible to the load 410 by changing an orientation of a rotor 310 of a gyroscopic module 310 versus the orientation of the rotor 310 of the gyroscopic module 110, where the rotor 310 is rotating with an angular momentum of magnitude L and the reference orientation is with the rotor 310 rotating in a positive direction about the y-axis.

The graph 1300 includes a first plot (Y+) which illustrates the maximum angular momentum impartible to the load 410 in a positive direction about the y-axis by changing the orientation of the rotor 310. The graph 1300 includes a second plot (Y−) which illustrates the maximum angular momentum impartible to the load 410 in a negative direction about the y-axis by changing the orientation of the rotor 310.

As can be seen from graph 1300, when the rotor 310 is rotating in a positive direction about the y-axis, a maximum amount of angular momentum can be imparted to the load 410 in a positive direction about the y-axis by reorienting the rotor 310 of the gyroscopic module 110. However, no angular momentum can be imparted to the load in a negative direction about the y-axis by reorienting the rotor 310 of the gyroscopic module 110.

Similarly, when the rotor 310 is rotating in a negative direction about the y-axis, a maximum amount of angular momentum can be imparted to the load 410 in a negative direction about the y-axis by reorienting the rotor 310 of the gyroscopic module 110. However, no angular momentum can be imparted to the load in a positive direction about the y-axis by reorienting the rotor 310 of the gyroscopic module 110.

When the rotor 310 is rotating about the z-axis, angular momentum can be imparted to the load 410 in either direction about the y-axis by reorienting the rotor 310 of the gyroscopic module 110. The gyroscopic module 110 can therefore be configured with the rotor 310 rotating about the z-axis prior to lifting the load 410, so that the load 410 can be rotated in either direction about the y-axis, if needed. Alternatively, where more angular momentum will be required to be imparted to the load 410 in one direction about the y-axis, the gyroscopic module 110 can be configured with the rotor 310 rotating about the y-axis in that direction prior to lifting the load 410. Such biasing of the rotor 310 to enable more angular momentum to be imparted to the load 410 will be referred to hereinafter as "preloading".

For example, the gyroscopic module 110 can be configured without affecting the orientation of a load 410 by configuring the gyroscopic module 110 while a load is on the ground, for example, before lifting a load 410 or before detaching a load after it has been lifted to a new location.

Figure 19:
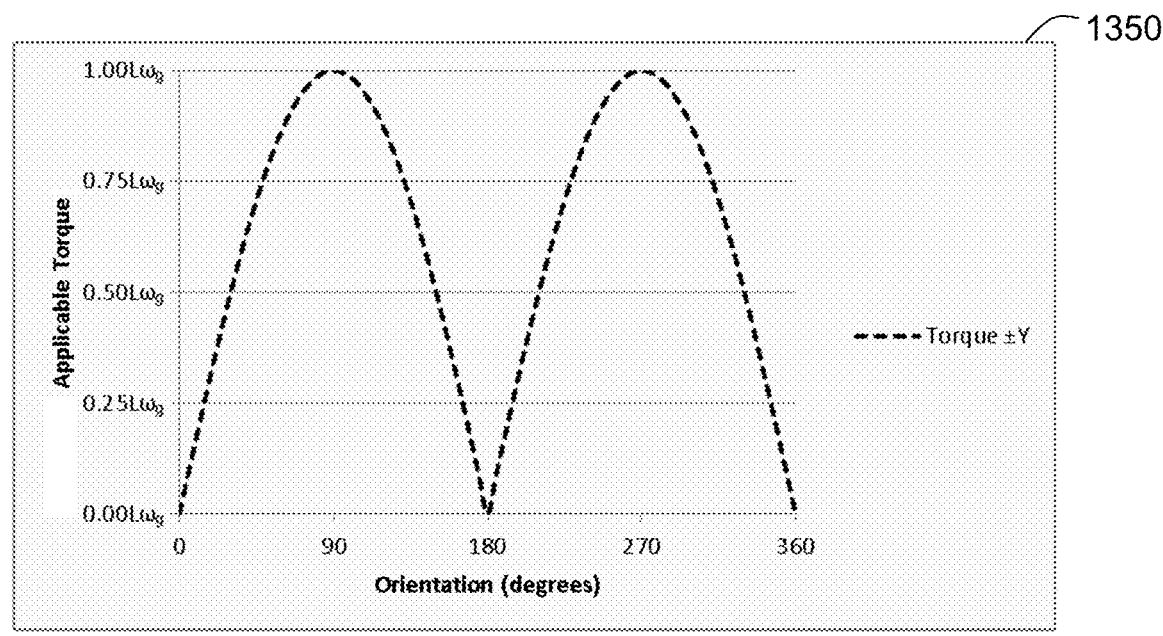
FIG. 19 illustrates an example graph of a torque applicable to the load by changing an orientation of a rotor of a gyroscopic module versus the orientation of the rotor of the gyroscopic module.

FIG. 19 illustrates an example graph 1350 of a torque applicable to the load 410 by changing an orientation of a rotor 310 of a gyroscopic module 310 versus the orientation of the rotor 310 of the gyroscopic module 110, where the rotor 310 is rotating with a momentum of magnitude L and the reference orientation is with the rotor 310 rotating in a positive direction about the y-axis.

The graph 1350 illustrates a torque applicable by changing the orientation of the rotor 310 by rotating the gimbal 320 at an angular velocity $\omega_g$. As can be seen from graph 1350, when the rotor 310 is rotating about the y-axis, a minimum amount of torque can be applied to the load 410 about the y-axis, and when the rotor 310 is rotating about the z-axis, a maximum amount of torque can be applied to the load 410 about the y-axis.

The gyroscopic module 110 can therefore be configured with the rotor 310 rotating about the z-axis, for example, prior to lifting the load 410, if a large amount of torque will be needed early in the lift. A configuration with the rotor 310 rotating about the z-axis is referred to hereinafter as a "neutral configuration".

In some embodiments, one or more gyroscopic modules 110 are preloaded by configuring the rotor 310 to be rotating about the y-axis in a predefined direction and one or more gyroscopic modules 110 are configured in a neutral configuration with the rotor 310 rotating about the z-axis. For example, one gyroscopic module 110 preloaded in a predefined direction and one gyroscopic module 110 are configured in a neutral configuration could induce a maximum angular momentum of 3L in the predefined direction about the y-axis and a maximum angular momentum of L in the opposing direction about the y-axis.

Table 1 below shows properties for five example systems according to some embodiments of the invention. The properties include the rotation of the load 410 and the load support structure 420 in calculations.

TABLE 1

|  | Load Size | No. of Rotors | Material Density | Rotor Mass (Kg) | Rotor Speed, $\omega_r$ (RPM) | Servo-Motor Displacement (Degrees) |
|---|---|---|---|---|---|---|
| System 1 | Large | 2 | 7801 | 50.3 | 3000 | 90 |
| System 2 | Large | 2 | 11370 | 73.34 | 3000 | 90 |
| System 3 | Medium | 2 | 7801 | 50.3 | 3000 | 90 |
| System 4 | Medium | 2 | 7801 | 50.3 | 3000 | 90 |
| System 5 | Medium | 2 | 7801 | 98.97 | 3000 | 90 |

Table 2 below shows more properties of the example systems described in Table 1.

TABLE 2

| | Object/Part Masses (Kg) | | Moments of Inertia, Iyy (Kg · m^2) | | | |
|---|---|---|---|---|---|---|
| | All Rotors | Entire System | 1× Rotor | All Rotors | Load | Entire System |
| System 1 | 100.6 | 36,780 | 0.98 | 1.96 | 223453 | 227070 |
| System 2 | 146.68 | 36,826 | 1.4289 | 2.8578 | 223453 | 227212 |
| System 3 | 100.6 | 5289.8 | 0.98 | 1.96 | 36865 | 40624 |
| System 4 | 100.6 | 5042.5 | 0.98 | 1.96 | 36865 | 39608 |
| System 5 | 197.94 | 5139.9 | 1.953 | 3.906 | 36865 | 39673 |

Table 3 below shows more properties of the example systems described in Table 1 and Table 2.

TABLE 3

| | System Maximum Angular Velocity | | Angular Momentum Imparted (ΔL) | Servo-Motor Speed, $\omega_s$ (90 deg. in 5 s) | Maximum Applicable Torque |
|---|---|---|---|---|---|
| | Rad/s | RPM | N · m · s | Rad/s | N · m |
| System 1 | 0.0027 | 0.0258 | 613.09 | 0.314159 | 122.62 |
| System 2 | 0.00395 | 0.0372 | 897.49 | 0.314159 | 179.50 |
| System 3 | 0.0152 | 0.145 | 617.48 | 0.314159 | 123.50 |
| System 4 | 0.0151 | 0.144 | 598.08 | 0.314159 | 119.62 |
| System 5 | 0.0309 | 0.144 | 1225.90 | 0.314159 | 245.18 |

Figure 20:
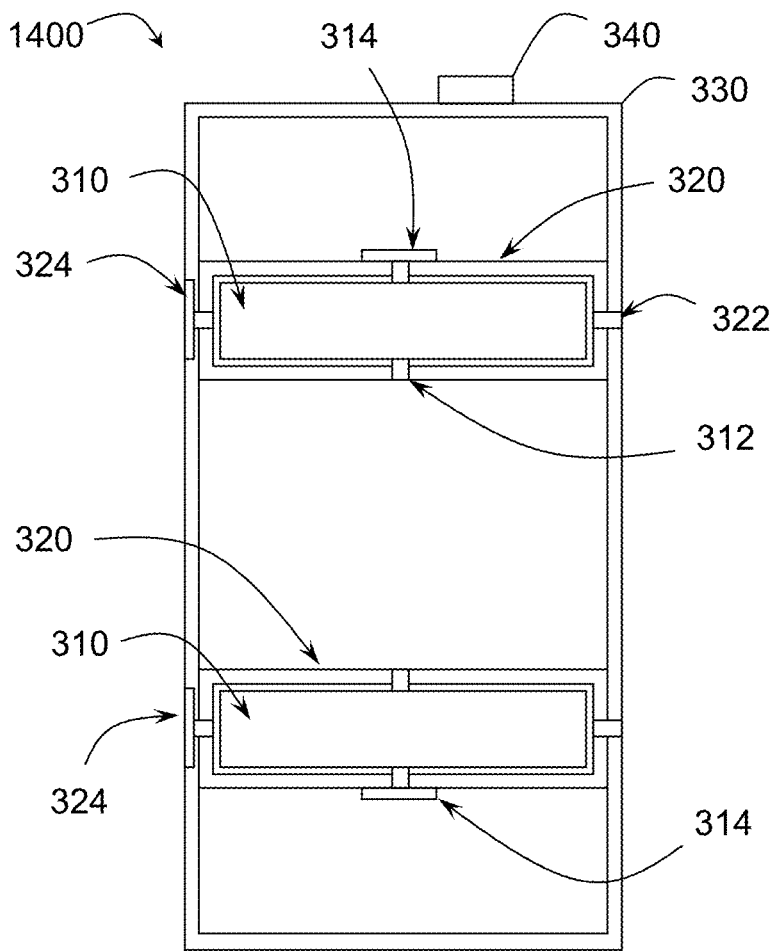
FIG. 20 is a plan view of a gyroscopic unit according to one embodiment of the invention.

FIG. 20 is a plan view of a gyroscopic unit 1400 according to one embodiment of the invention. The gyroscopic unit 1400 comprises casing 330 and two gyroscopic modules 110 mounted to the casing 300. The gyroscopic modules 110 can each be controlled independently by the controller 120. The two gyroscopic modules 110 in a single casing 330 can perform a similar function to the configurations of two gyroscopic modules 110 shown in FIGS. 8-11. In some embodiments, more than two gyroscopic modules 110 are including in one casing.

While the embodiments described above provide examples of the invention, embodiments of the invention can comprise more than one rotor and/or more than one gimbal in each gyroscopic module. In one example, a gyroscopic module comprises two or three gimbals such that the rotor 310 can be reoriented in two or three dimensions. A second motor, lock and/or clutch can be provided for each gimbal to control the orientation of the rotor about each axis. In another example, a gyroscopic module comprises two rotors within a gimbal. A first motor, lock and/or clutch can be provided for each rotor such that the velocities of each rotor can be individually controlled. For example, the rotors can be accelerated in opposing directions by the controller such that no net torque is applied to the load 410. A torque can then be applied to the load 410 by decelerating one of the rotors via the controller 120. Because the rotor can typically be decelerated faster than it can be accelerated, a greater torque can be provided to the load in a momentum wheel configuration.

Figure 21:
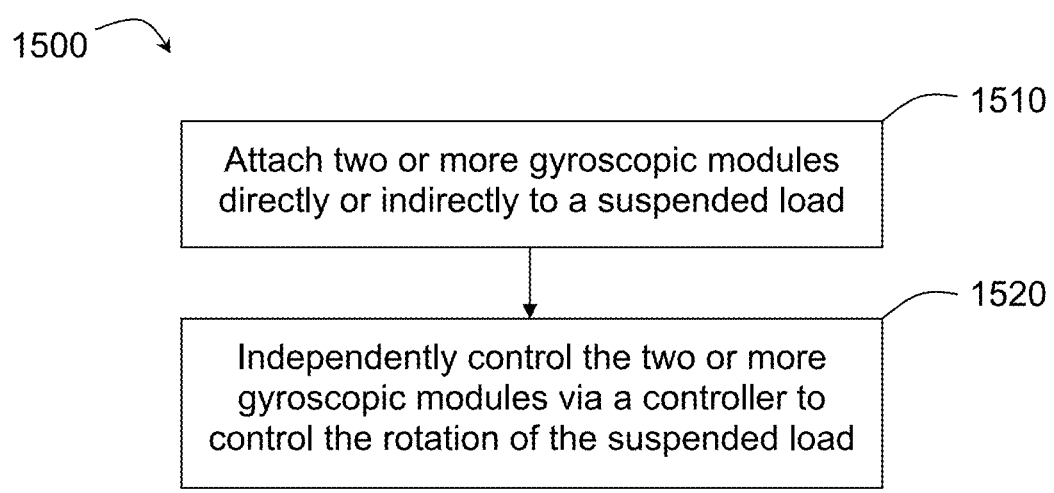
FIG. 21 is a general flow diagram of a method for controlling a rotation of a suspended load according to one embodiment of the invention.

FIG. 21 is a general flow diagram of a method 1500 for controlling a rotation of a suspended load according to one embodiment of the invention. In some embodiments, the method 1500 is performed in the system 100. The method 1500 comprises the following steps.

At step 1510, the method 1500 comprises attaching two or more gyroscopic modules 110 directly or indirectly to the suspended load 410.

At step 1520, the method 1500 comprises independently controlling the two or more gyroscopic modules 110 via a controller 120 to control the rotation of the suspended load.

In one example, the two or more gyroscopic modules 110 are controlled via the controller to impart a moment to the suspended load 410. In another example, the two or more gyroscopic modules 110 are controlled via the controller 120 to maintain an orientation of the suspended load.

Figure 22:
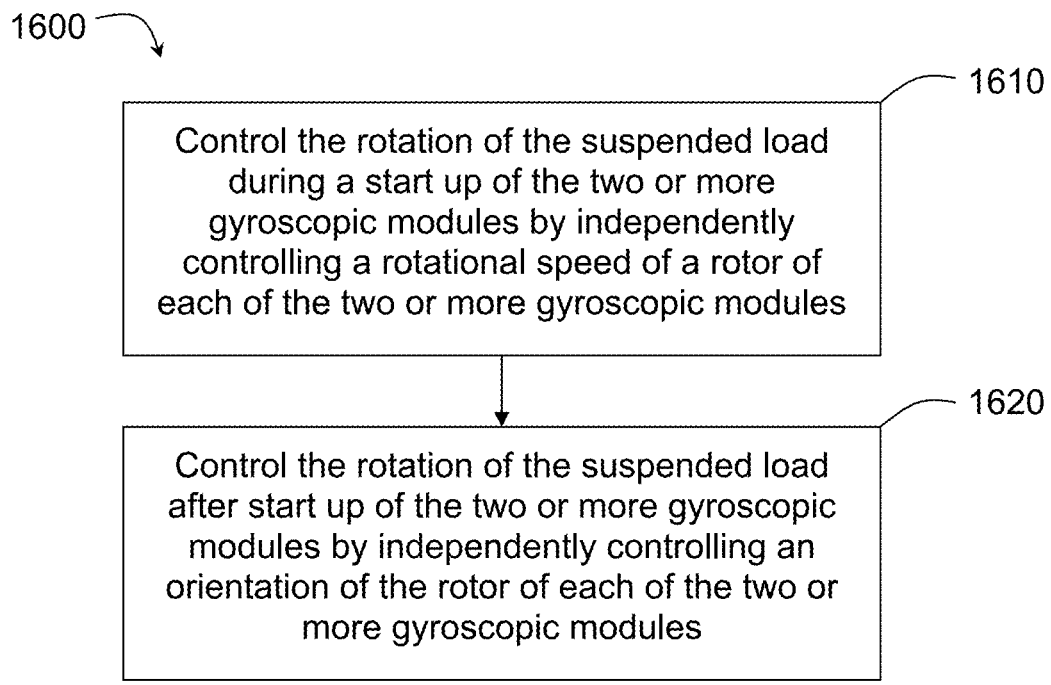
FIG. 22 is a general flow diagram of a second method for controlling a rotation of a suspended load according to one embodiment of the invention.

FIG. 22 is a general flow diagram of a method 1600 for controlling a rotation of a suspended load according to one embodiment of the invention. The method 1600 controls a rotation of a suspended load 410 via two or more gyroscopic modules 110 that are coupled directly or indirectly to the suspended load. The method 1600 comprises the following steps.

At step 1610, the method 1600 comprises controlling the rotation of the suspended load during a start up of the two or more gyroscopic modules 110 by independently controlling an angular velocity of a rotor 310 of each of the two or more gyroscopic modules 110.

At step 1620, the method 1600 comprises controlling the rotation of the suspended load after start up of the two or more gyroscopic modules 110 by independently controlling an orientation of the rotor 310 of each of the two or more gyroscopic modules 110.

Figure 23:
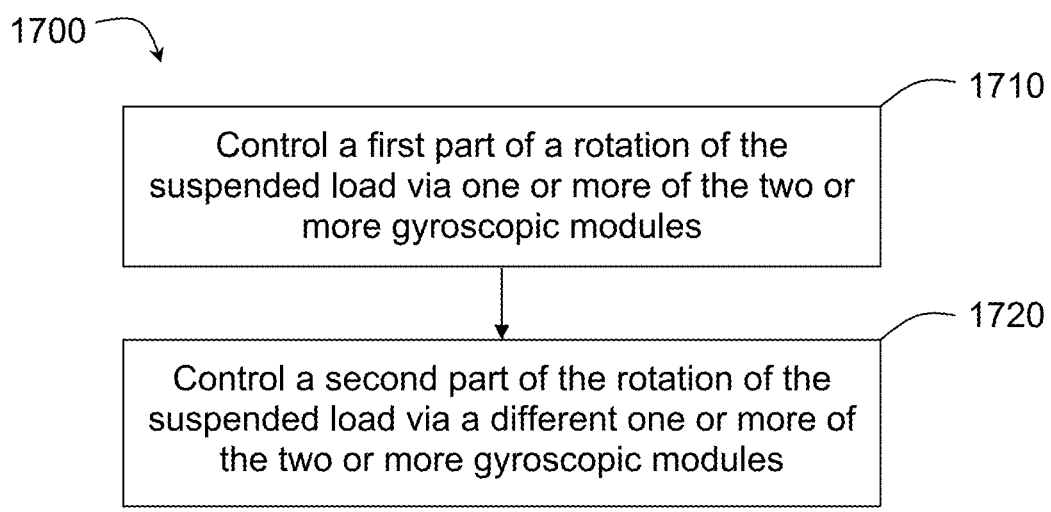
FIG. 23 is a general flow diagram of a third method for controlling a rotation of a suspended load according to one embodiment of the invention.

FIG. 23 is a general flow diagram of a method 1700 for controlling a rotation of a suspended load according to one embodiment of the invention. The method 1700 controls a rotation of a suspended load via two or more gyroscopic modules 110 that are coupled directly or indirectly to the suspended load 410. The method 1700 comprises the following steps.

At step 1710, the method 1700 comprises controlling a first part of a rotation of the suspended load 410 via one or more of the two or more gyroscopic modules 110.

At step 1720, the method 1700 comprises controlling a second part of the rotation of the suspended load 410 via a different one or more of the two or more gyroscopic modules 110.

For example, as discussed above, once a rotor 310 of a gyroscopic module 110 reaches a certain orientation, the rotor 310 can only impart momentum to the suspended load 410 in one direction about the y-axis. If further momentum is needed in the other direction about the y-axis, another gyroscopic module 110 can be used to impart this momentum.

Figure 24:
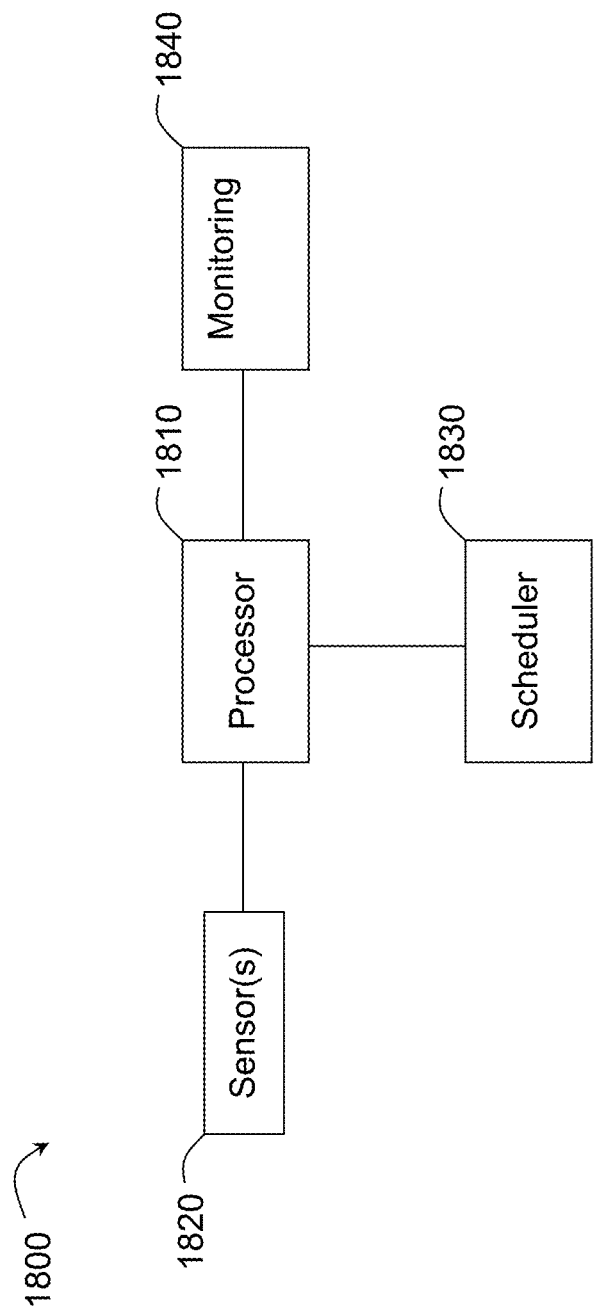
FIG. 24 illustrates a load management system according to one embodiment of the invention.

FIG. 24 illustrates a material management system and in particular a load management system 1800 according to one embodiment of the invention. The material/load management system 1800 comprises a processor 1810 in communication with one or more sensors 1820, a scheduler 1830 and one or more monitoring systems 1840.

The one or more sensors 1820 include, for example, load recognition sensors, situational awareness sensors, position sensors and/or motion sensors. The one or more sensors 1820 can be located, for example, on a gyroscopic unit, on a load support structure, on a crane, at a load pick up/drop off location, and/or in other locations on a worksite, port, or other applicable area or environment of operation.

The processor 1810 receives and processes data from the one or more sensors 1820 and the processed data is used, for example, to monitor safety and/or progress and/or productivity on the worksite, port etc. and update project plans and/or schedules of work activities and material flows.

The scheduler 1830 updates one or more schedules, such as, for the building site, port or a project, based on the data from the one or more sensors 1820 processed by the processor 1810.

The one or more monitoring systems 1840 provide automatic or manual monitoring via one or more displays or by inputting data from the processor 1810 into other systems for control of the material/loads or monitoring of movements on the worksite. For example, the one or more monitoring systems 1840 can be used for monitoring and/or control of safety on the worksite, progress in projects and the current state of loads.

In some embodiments, the one or more of the monitoring systems 1840 are mobile computing devices, such as, tablets, smart phones or laptops. However, the one or more of the monitoring systems 1840 can include any computing device which display and/or uses the data processed by the processor 1810 based on one or more of the sensors.

The one or more of the monitoring systems 1840 can be used to manage the worksite and projects by displaying relevant information relating to the worksite, project and/or load, for example, to site supervisors, on site engineers, project schedulers, clients, shipping companies, freight forwarders, hire companies, customs officers or crane manufactures. This enables parties involved at each level of the logistics to be coordinated by the system. In some embodiments, consolidated reports are provided to hire companies or crane manufactures to enable the use of cranes to be monitored.

Figure 25:
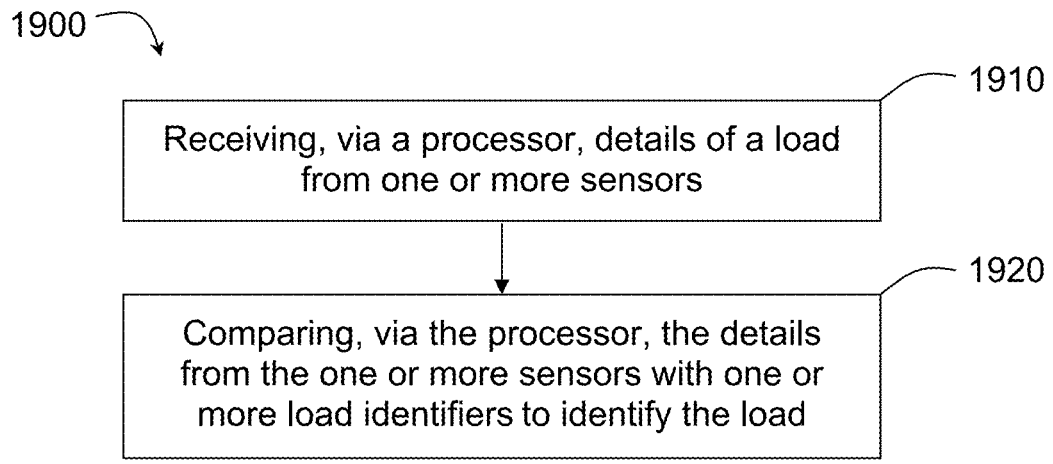
FIG. 25 illustrates a load recognition method according to one embodiment of the invention.

FIG. 25 illustrates a material, and in particular load recognition method 1900 according to one embodiment of the invention. The method 1900 comprises the following steps.

At step 1910, the method 1900 comprises receiving, via a processor, details of a load from one or more sensors. For example, the processor can be the processor 1810 and can receive details of the load from one or more load recognition sensors 1820. The load recognition sensors can include, for example, a camera to identify the load using photogrammetric recognition, a code reader to read a code associated with the load, such as a barcode or a quick response (QR) code, and/or a radio frequency identification (RFID) reader to read an RFID tag associated with the load. In some embodiments, the camera is on the crane to view the load before, during and/or after the lift.

At step 1920, the method 1900 comprises comparing, via the processor, the details from the one or more sensors with one or more load identifiers to identify the load. For example, the load identifiers can include one or more three-dimensional models of items, RFID codes, barcodes, QR codes, or shipping manifests or truck waybills for one or more shipments to or from the worksite, port etc. In some embodiments, the load identifiers are stored in a database that is in communication with the processor. For example, the database includes identifiers for each item in a project or on a worksite.

Figure 26:
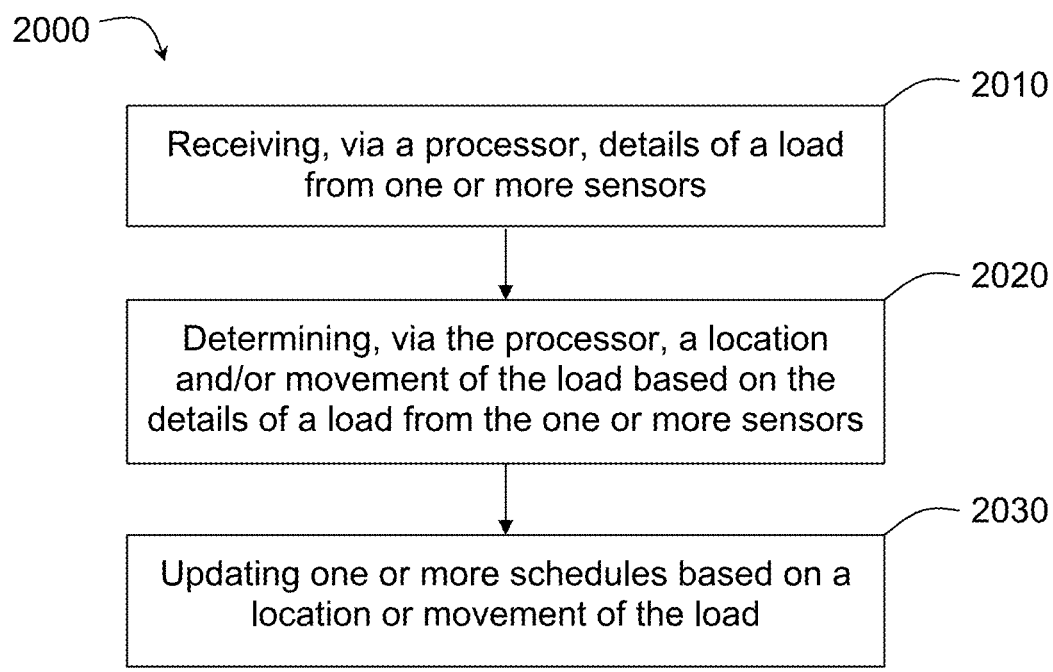
FIG. 26 illustrates a scheduling method according to one embodiment of the invention.

FIG. 26 illustrates a scheduling method 2000 according to one embodiment of the invention. The method 2000 comprises the following steps.

At step 2010, the method 2000 comprises receiving, via a processor, details of a load from one or more sensors. For example, the processor can be the processor 1810 and can receive details of the load from the one or more sensors 1820.

At step 2020, the method 2000 comprises determining, via the processor, a location and/or movement of the load based on the details of a load from the one or more sensors.

At step 2030, the method 2000 comprises updating one or more project plans and/or schedules based on the location and/or movement of the load. In some embodiments, the one of more schedules are updated based on the identification of the load and, for example, other data received and processed by the processor 1810 from the sensors 1820, such as, the location of the load. For example, one or more schedules can be updated to indicate that a load has been lifted from a location on a worksite or set down at a location on the worksite. In some embodiments, the scheduler 1830 automatically updates actions on the worksite or in a project plan based on the updated schedule, for example, to mitigate safety hazards and/or provide optimal use of resources and/or determine a present state and/or relative progress of a project.

Figure 27:
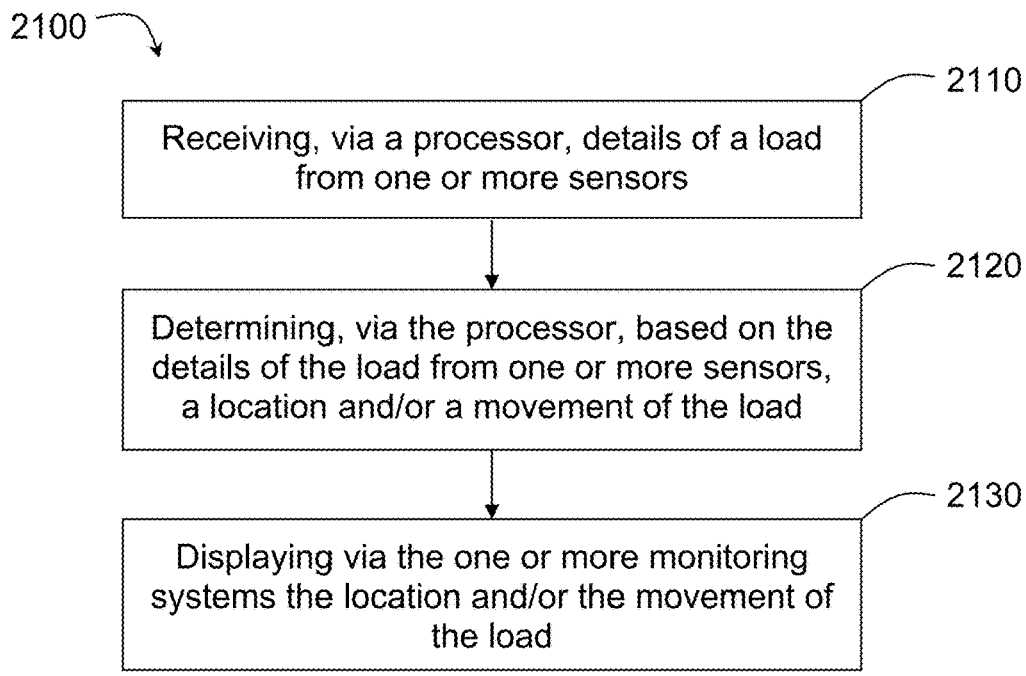
FIG. 27 illustrates a monitoring method according to one embodiment of the invention.

FIG. 27 illustrates a monitoring method 2100 according to one embodiment of the invention. The method 2100 comprises the following steps.

At step 2110, the method 2100 comprises receiving, via a processor, details of a load from one or more sensors. For example, the processor can be the processor 1810 and can receive details of the load from the one or more sensors 1820.

At step 2120, the method 2100 comprises determining, via the processor, based on the details of the load from one or more sensors, a location and/or a movement of the load. For example, the one or more monitoring systems can be the one or more monitoring systems 1840.

At step 2130, the method 2100 comprises displaying via one or more monitoring systems the location and/or the movement of the load. In some embodiments, once the load is identified, the processor 1810 outputs, via one or more of the monitoring systems 1840, a location and a movement of the load based on data from one or more of the position sensors and/or motion sensors 1820. This enables the load to be tracked around the worksite, port etc.

In some embodiments, the processor 1810 determines and outputs, via one or more of the monitoring systems 1840, information relating to the load and the lift, including, for example, a pick up time and pickup location of the lift, a path of the load during the lift, a put down time and location of the lift, an orientation of the load at pickup, orientations of the load throughout the lift, an orientation of the load at put down, a time from lift off to release, a distance travelled by the load from pick up to put down in three dimensions, a duration of the lift where the load is travelling, a duration of the lift where the load is stationary, an amount of rotation used/allowed, and/or an amount of manual input received during the lift.

In some embodiments, the processor 1810 receives information from the scheduler 1830 including a type of the load, such as, permanent works, temporary works, rubbish, construction equipment, man cage; a weight of the load; or a direction of movement of the load, such as from the ground or transport onto the job or from the job onto the ground or transport. The processor 1810 can output this information, via one or more of the monitoring systems 1840, with the other information to enable improved monitoring of aspects of the worksite and the lifting of loads. For example, the weight of the load is determined based on load identification above and project data for the load stored in the database, or via sensors, such as load cells, attached to a hook, lifting beam or rigging that supports the load. In some embodiments, a weight determined via the processor 1810 based on one or more of the sensors 1820 is compared to a weight in the database to assist in determining the identity of the load and/or to determine whether there are changes in the load. This can enable tampering with the load, such as, parts of the load falling off or people removing or stealing parts of the load, to be detected.

Figure 28:
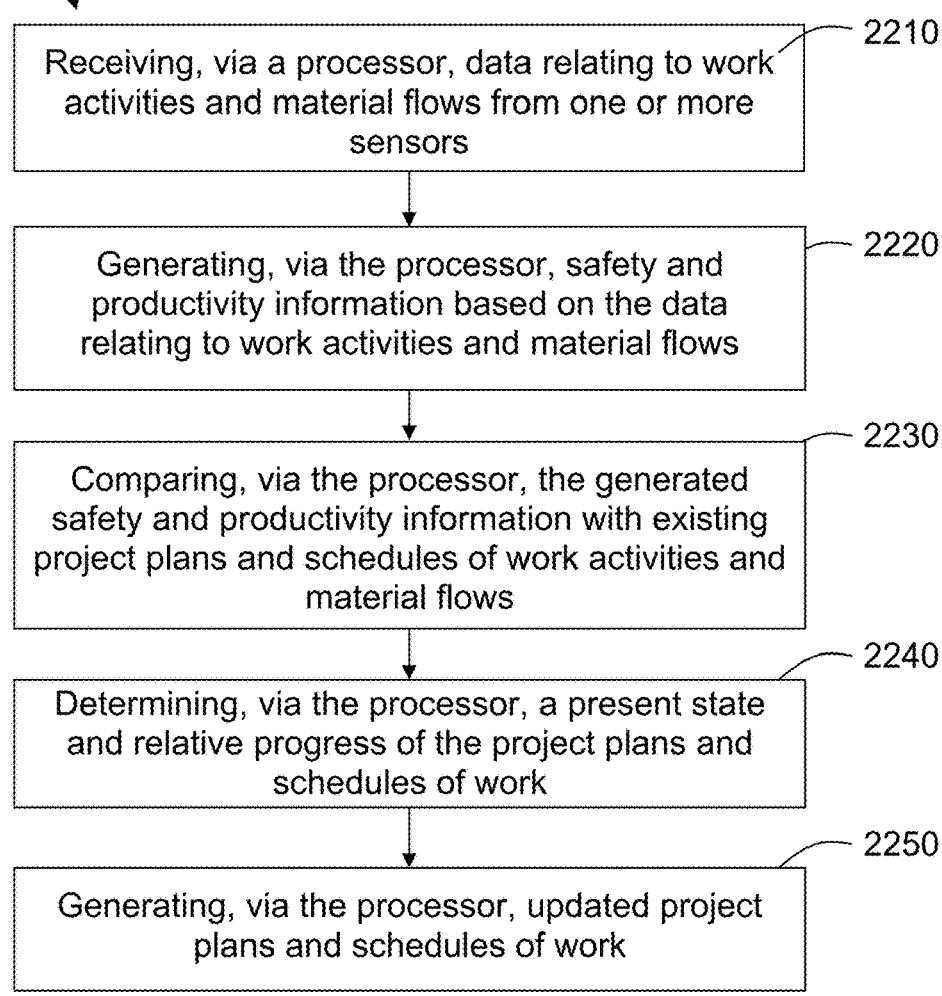
FIG. 28 illustrates a load management method according to one embodiment of the invention.

FIG. 28 illustrates a material management method 2200 according to one embodiment of the invention. The method 2200 comprises the following steps.

At step 2210, the method 2200 comprises receiving, via a processor, data relating to work activities and material flows, such as details of a load and/or a surrounding environment, from one or more sensors. For example, the processor can be the processor 1810 and can receive details of the load and/or the surrounding environment from the one or more sensors 1820.

The one or more sensors can include, for example, situational awareness sensors, such as, cameras, wind speed and direction sensors, thermal imaging, Light Detection and Ranging (LIDAR), ultrasonic distance measurement, and/or movement and/or position sensors, such as, rotational and/or linear accelerometers, and/or Global Positioning System (GPS) devices At step 2220, the method 2200 comprises generating, via the processor, safety and productivity information based on the data relating to the work activities and material flows. The safety and productivity information based on the data relating to the work activities and material flows can include, but is not limited to a three dimensional map of the surrounding environment based on the details of the load and the surrounding environment received from the one or more sensors. In some embodiments, the database is updated in real-time with a three dimensional map of the project or worksite, for example, as structures are built and items are moved.

At step 2230, the method 2200 comprises comparing, via the processor, the generated safety and productivity information with existing project plans and schedules of the work activities and material flows. For example, step 2230 can include, but is not limited to a location and/or rotation of the load with the map of the surrounding environment. In some embodiments, the processor 1810 determines a shape and size of the load from the load recognition sensors and/or the database.

At step 2240, the method 2200 comprises determining, via the processor, a present state and relative progress of the project plans and schedules of work. For example, step 2240 can include, but is not limited to a safe movement for the load. For example, the processor 1810 can automatically determine, based on the information in the database, a safe path for the load to avoid other objects and structures. In some embodiments, the processor 1810 is the controller described above or performs one or more functions of the controller to control the lift of the load. The processor can also determine, using the details of a load and/or a surrounding environment, potential hazards and/or incidents. For example, the processor 1810 processes data from the situational awareness sensors 1820 and determines information, such as, a number of people in the area at pick up and/or put down, a proximity of people to the path of the load during the lift, a proximity of people to the load during put down, a nearest approach to other structures or equipment, a maximum acceleration or shock from any impacts between the load or load support structure and other objects, wind conditions at different locations or heights during the lift, and/or a maximum output torque employed during the lift.

In some embodiments, the data from the situational awareness sensors 1820 is used by the processor 1810 for safety management, for example, to avoid hazards and provide information to enable the setting up of safe systems of work and/or controls to mitigate hazards. In some embodiments, the safe systems of work and controls are accessed by the processor 1810 and the processor outputs information, via the one or more monitoring systems, regarding the compliance with the safe systems and controls on the worksite. Such detailed tracking of execution of work via the sensors enables real time auditable monitoring of performance of work and compliance with and effectiveness of safe systems and mitigations.

In one example, computer readable code components are executed by the processor 1810 to track a movement of all loads and personnel in close proximity to one or more loads while suspended. The processor 1810 automatically analyses images captured by one or more of the sensors, such as, cameras, to determine a location of personnel relative to one or more suspended loads. For example, the processor 1810 searches images as they are received from one or more of the sensors to determine the locations. The processor 1810 transmits real time alerts via one or more of the monitoring systems 1840 of breaches of safety rules, for example, personnel standing too close/under suspended loads, or cranes moving loads over personnel.

At step 2250, the method 2200 comprises generating, via the processor, updated project plans and schedules of work.

In some embodiments, reports are automatically generated via the processor 1810 periodically, for example, hourly, daily or weekly or on demand. Computer readable code components are executed by the processor 1810 to automatically sort the data received from the sensors 1810 and determine incidents and periods of non-compliance with the safety rules.

In some embodiments, project estimates and schedules are automatically generated via the processor 1810 based on quantities determined from the sensors, or manually input, such as, numbers of personnel allocated to a task and estimated cycle times for repetitive activities.

In some embodiments, the processor 1810 conducts automated analysis and consolidation of performance of actual rates of production compared to planned rates at detailed load by load level, or at crane by crane level or at a discipline level. For example, in some embodiments, the processor 1810 uses the data from the one or more sensors to measure a cycle time for pick up, travel and/or put down, and/or numbers of personnel involved at each stage of the lift. In some embodiments, the processor 1810 compares the measured cycle time and/or numbers of personnel involved at each stage of the lift with the planned or allocated quantities, and automatically transmits an alert to one or more of the monitoring systems 1840 if there are anomalies. In some embodiments, the processor 1810 determines if there are wasted movements and/or excess personnel and automatically transmits an alert to one or more of the monitoring systems 1840 if there are excess moments and/or excess personnel. For example, excess movements can include excess vertical travel of loads compared to heights required to clear structures and equipment, excess horizontal travel compared to shortest path from pick up to put down, and/or loads returned to the ground or transport where this was not part of the plan. Excess personnel can include excess personnel in the area at pick up and/or put down compared to personnel allocated to the task. In some embodiments, the processor 1810 flags loads that were returns to group or transport outside the plan. The processor 1810 can also record typical weights of loads lifted compared to size/capacity of the crane to, for example, provide data on crane utilisation and/or potential to re-deploy cranes for more appropriate use and/or to optimise maintenance schedules to maximise useful life for equipment and minimise downtime.

Figure 29:
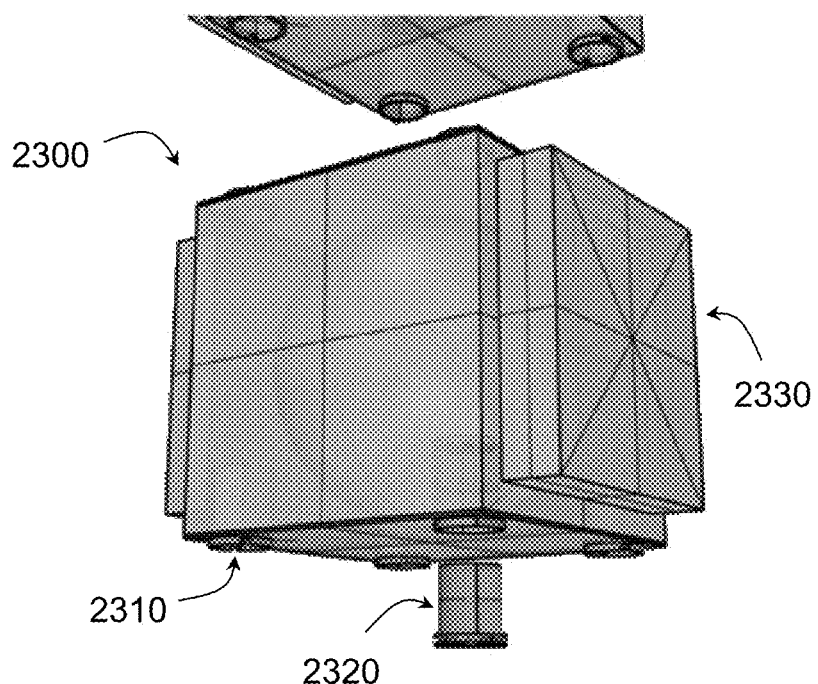
FIG. 29 illustrates a gyroscopic unit according to one embodiment of the invention.

FIG. 29 illustrates a gyroscopic unit 2300 according to one embodiment of the invention. The gyroscopic unit 2300 comprises one or more sockets or recesses 2310 in which sensor modules 2320 can be installed. Each sensor module 2320 comprises one or more sensors. In the embodiment shown, the sockets 2310 are located adjacent the corners of the gyroscopic unit 2300. The volume inside the gyroscopic unit 2300 that is swept by the rotor is typically spherical. Therefore, space can be conserved by locating the sockets 2310 adjacent the corners of a cubic gyroscopic unit 2300.

While FIG. 29 shows sockets all pointing in a single direction on a top or bottom of the gyroscopic unit 2300, in other embodiments, the gyroscopic unit can include, for example, sockets on any one or more of the sides of the gyroscopic unit 2300 such that they are clear of the volume swept by gimbal/rotor/motors. In some embodiments, the sockets also function as quick attachment points for joining gyroscopic units 2300 together, for example, side by side or one on top of another.

The sensor modules 2320 can be configured according to the application. For example, sensor modules 2320 comprising down facing sensors can be configured in sockets 2310 on a bottom of the gyroscopic module 2300.

In some embodiments, a sensor processing module 2330 is fastened to the side of the gyroscopic unit 2300, as shown in FIG. 29. The sensor processing module 2330 can comprise one or more sensors and/or a processor for analysing data from the sensors of the gyroscopic unit 2300.

In some embodiments, the processed data is transmitted, for example, wirelessly to a server or the cloud, such that it can be used to schedule and monitor the project or the worksite. In some embodiments, the processed data and/or the sensor data is stored on a storage device of the sensor processing module 2330 and can be downloaded at a later time for analysis.

Figure 30:
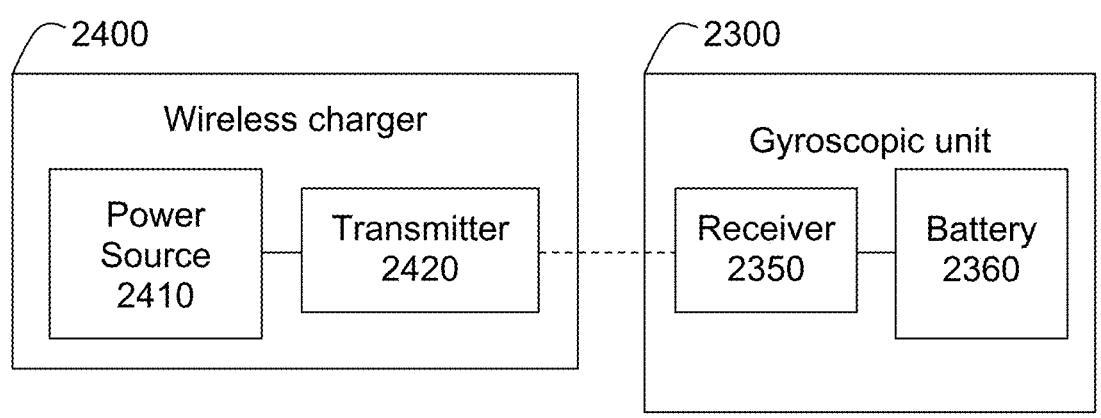
FIG. 30 illustrates a wireless charger for a gyroscopic unit according to one embodiment of the invention.

FIG. 30 illustrates a wireless charger 2400 for the gyroscopic unit 2300 according to one embodiment of the invention. The wireless charger 2400 comprises a power source 2410 connected to a transmitter 2420. The transmitter 2420 can be located, for example, on the crane or in another location near the gyroscopic unit 2300 in use. The gyroscopic module 2300 comprises a receiver 2350 which receives power from the transmitter 2420 and charges a battery 2360 of the gyroscopic unit 2300. For example, receiver 2350 receives power from the transmitter 2420 via electromagnetic waves. Where the transmitter 2420 is close to the receiver 2350 (short range charging), power can be transmitted, for example, via inductive, capacitive or magneto-dynamic coupling. Where the transmitter 2420 is further from the receiver 2350 (long range charging), power can be transmitted, for example, via microwaves or light waves.

In some embodiments, the transmitter 2420 is located near the tip of a boom of the crane, and the power source 2410 is a power source of the crane. The gyroscopic unit 2300 can be moved closed to the transmitter 2420 between lifts to charge the battery 2360, for example, by raising the load support structure.

In some embodiments, transmitter 2420 charges the gyroscopic unit 1900 during lifts. Such regular charging of the gyroscopic units 2300 enables the gyroscopic units 2300 to maintain battery charge during operations, and mitigates the need to disconnect the gyroscopic units 2300 from the load support structure or the crane for charging. The use of regular charging also reduces the size and weight required for batteries in the gyroscopic units 2300.

In alternative embodiments, a source terminal is located at the tip of the boom and a receiver terminal of the gyroscopic unit 2300 is brought into contact with the source terminal to charge the gyroscopic units 2300. For example, the source terminal is brought into contact with the receiver terminal by raising the load support structure comprising the gyroscopic units 2300 between lifts.

Figure 31:
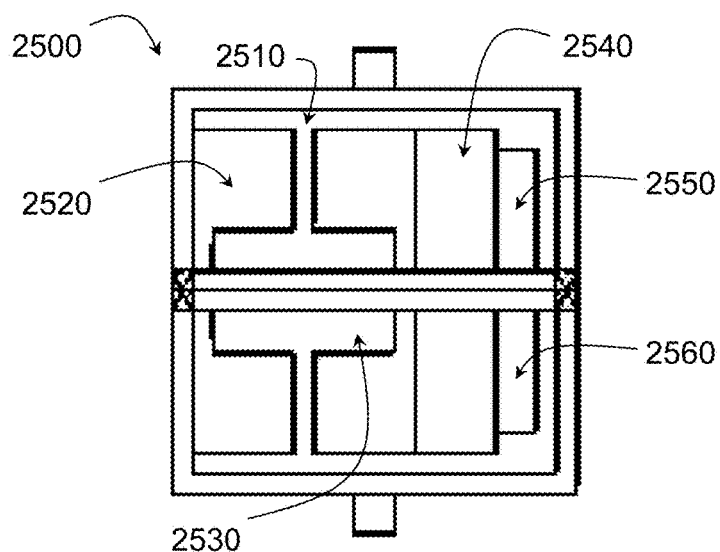
FIG. 31 illustrates a rotor of a gyroscopic module according to one embodiment of the invention.

FIG. 31 illustrates a rotor 2500 of a gyroscopic module according to one embodiment of the invention. The rotor 2500 comprises a motor 2510, including a motor stator 2520 and motor rotor 2530, for accelerating and decelerating the rotor 2500 and one or more batteries 2540 for powering the motor 2510. The rotor 2500 also comprises a controller 2550 for controlling the motor 2510 to control the speed of the rotor 2500 and a receiver 2560 to receive power to charge the one or more batteries 2540.

In some embodiments, another part of the gyroscopic unit 2300 comprises the receiver 2560 and is electrically connected to the one or more batteries 2540 in the rotor 2500 via one or more slip rings.

Similar configurations can be used to charge one or more batteries associated with the motor which drives the gimbal.

Figures 32, 32A:
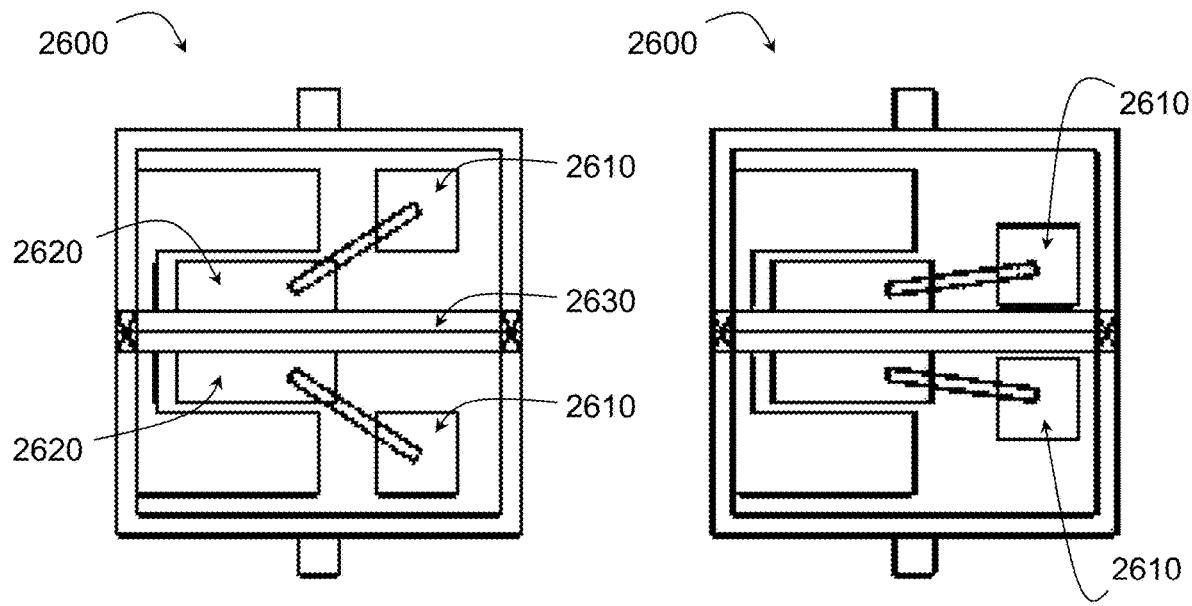
FIG. 32 illustrates a first configuration of a rotor of a gyroscopic module having variable moment of inertia according to one embodiment of the invention.
FIG. 32A illustrates a second configuration of a rotor of a gyroscopic module having variable moment of inertia according to one embodiment of the invention.

FIGS. 32 and 32A illustrate a rotor 2600 of a gyroscopic module according to one embodiment of the invention. The rotor 2600 comprises repositionable weight which can be controlled by the controller 120 to vary the moment of inertia of the rotor 2600. In the embodiment shown, the weight is a battery 2610. The battery 2610 is connected to coils 2620 of the motor rotor 2630 to power the motor 2620. The battery 2610 can be repositioned toward the periphery of the rotor 2600 to increase the moment of inertia as shown in FIG. 32A or repositioned toward the axis of the rotor 2600 to decrease the moment of inertia as shown in FIG. 32.

A reduction in the moment of inertia of the rotor 2600 increases the speed of the rotor 2600, while an increase in the moment of inertia of the rotor 2600 decreases the speed of the rotor 2600. This enables the speed of the rotor 2600 to be controlled, for example, to improve the efficiency of braking, such as, regenerative braking. In some embodiments, the speed of the rotor 2600 is controlled to enable energy to be lost to the environment more quickly, for example, by increasing the speed of the rotor 2600 to increase the loss of energy via air resistance. In some embodiments, the rotor 2600 has variable air resistance to enable energy to be lost more quickly. The loss of energy to the environment enables the rotor 2600 to be decelerated without imparting a torque to the load. The rotor 2600 can then impart a torque to the load to accelerate the rotor 2600. Repeating this process with multiple sets of rotors 2600 can enable a continuous moment to be imparted to the load by slowing or stopping the rotors, reconfiguring the rotors and then accelerating the rotors 2600 via the respective motors.

Figure 33:
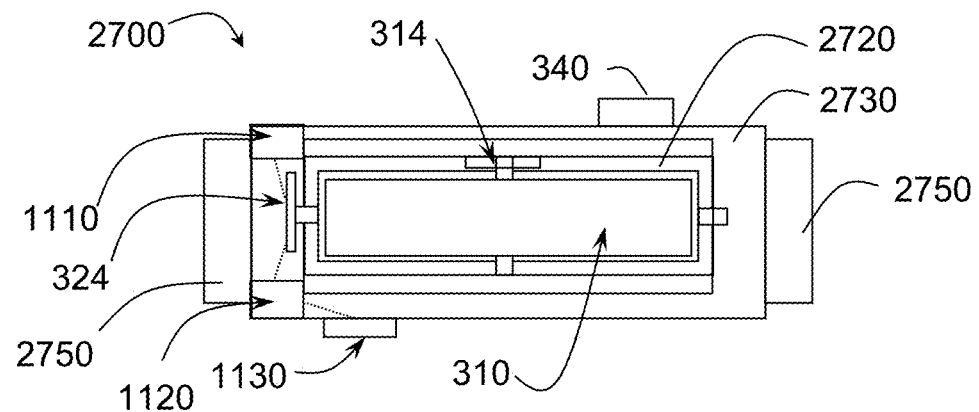
FIG. 33 is a plan view of a gyroscopic module according to another embodiment of the invention.
Figure 34:
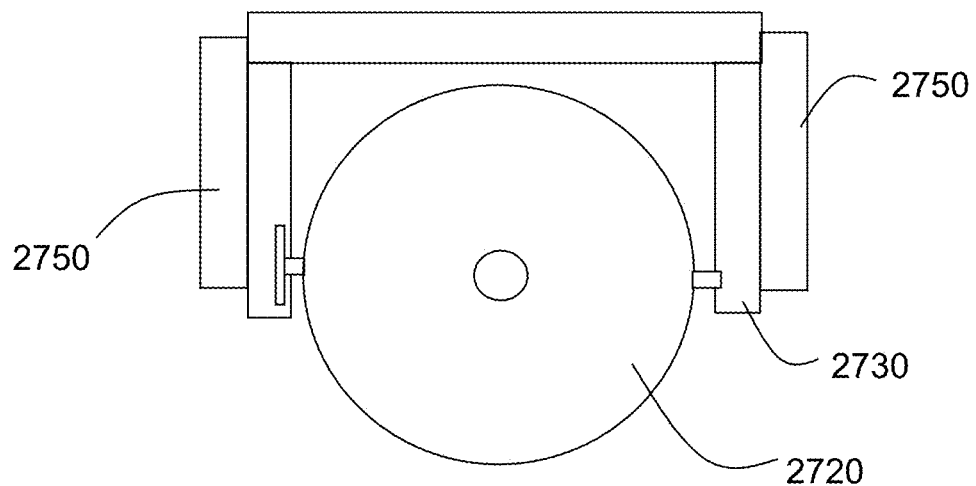
FIG. 34 is a side elevation of the gyroscopic module shown in FIG. 33.

Reference is now made to FIGS. 33 and 34 which show, respectively, a plan view and a side elevation of a gyroscopic module 2700 according to another embodiment of the present invention. The gyroscopic module 2700 comprises a rotor 310, an attachment means 340, a first motor 314, a second motor 324, a controller 1120, a power supply 1110 connected to the first motor 314, the second motor 324 and the controller 1120 and one or more sensors 1130 in communication with the controller 1120, as previously described.

The gyroscopic module 2700 comprises a two part casing. The rotor 310 is installed in a slim line rotor casing 2720 closely fitted over the outer diameter of the rotor 310 and with minimal clearance at the edge of the rotor 310. Rotor casing 2720 acts as a gimbal and pivots relative to an outer casing 2730. Hence, in this embodiment, the slim line casing 2720 pivots with the rotor 310.

The rotor casing 2720 can be any suitable shape to house the rotor 310, such as circular or square. For a square rotor casing 2720, the corners outside of the rotor containment and inside of the outer casing 2730 are used for instrumentation, batteries, and computational and communications modules.

For lifting beam assemblies with more than two rotors 310, the outer casing 2730 and rotor module is supported from the lifting beam with linkages or arms so that the casings 2720, 2730 fold in against the beam when the lifting beam is not in use. The linkages can alternatively be in the form of telescoping supports.

The linkages between the beam and the modules can be manually adjusted, mechanically powered or powered and automatically extended or retracted depending on clearance required between the modules and the beam. For lifting beams with one module 2700 at each end, the casing 2730 can be on a simple shaft set in a socket on the end of the beam. The sides of the outer casing 2730 provide a location for the attachment of photo-voltaic (PV) cells to provide increased battery life by capturing solar energy in between lifts.

The gyroscopic modules 2700 comprising pivoting casings have a number of advantages over rotors being housed in non-pivoting casings. For example, a pivoting casing provides a visual signal to personnel, such as a crane operator, and others in the area. Because the moment output and moment remaining are proportional to the rotor angle, it is critical for an operator to have a good knowledge of angular position of the rotor at all times. If the rotor 310 and casing 2720 pivot together, the operator can monitor position while looking at the lifting beam and/or load, without reference to any indicators on a screen. There will be significant advantages in terms of improving operator competence and control. In addition, any other people in the vicinity of the load will have immediate feedback on what the load is doing in terms of, for example, orientation and remaining moment capacity.

Pivoting casings reduce the space required. For a non-pivoting casing, the size of the casing is set by the diameter of the rotor 310 in three dimensions. For example, a 1 m diameter rotor needs a minimum casing size equivalent to a 1 m diameter sphere, or more practically a 1 m sided cube. A pivoting casing for a 1 m diameter rotor could be 1 m×1 m×200 to 300 mm. If the casings 2720, 2730 fold in against the beam for storage and transport, the space required is much reduced. For a 4 rotor system and a 300 mm wide lifting beam, the overall width for a non-pivoting assembly would be 2.3 m. A pivoting assembly could be 700 mm for 200 mm wide casings.

Pivoting casings reduce the strength required. The casing 2720 has to contain the spinning rotor 310 in the event of a structural failure of the rotor, bearings or shaft. If the rotor 310 is pivoting inside the casing, all 6 sides for a cubic casing and the whole surface for a spherical casing have to be able to withstand the impact and abrasion from a major malfunction of an object rotating at high speed. If the casing 2720 pivots with the rotor 310, only the outer diameter of the casing 2720 will be subject to the high forces, i.e. a narrow band of high strength as opposed to the entire casing.

Pivoting casings provide easier access, for example for inspection and maintenance purposes. In a non-pivoting casing some maintainable components will be well inside the casing, thus requiring generous openings in the sides for inspection and maintenance. For a pivoting casing no component will be more than a few millimetres from the outside, meaning access openings can be much smaller.

Gyroscopic modules 2700 comprising pivoting casings are compatible with a range of motor—battery—rotor types, including battery-in-rotor configurations. Another advantage is that the casings and the entire beam can automatically orient itself to obtain maximum solar radiation while the beam is in park mode between lifts.

Projects making use of crane operations are often deficient in ways and means to immediately communicate important information to all workers, for example safety messages including emergency alarms. According to some embodiments, the system and method of the present invention addresses or at least ameliorates this problem by creating a previously non-existent vantage point within the crane operation the present invention is part of and the project the crane operation is part of.

Such embodiments of the present invention include data being transmitted from the controller 120 to the gyroscopic module for output or broadcast to people within an audible and/or visible range of the gyroscopic module. For example, with reference to FIGS. 33 and 34, the gyroscopic module 2700 comprises an audio-visual communication system 2750, such as one or more displays, e.g. a weatherproof flat screen digital display/monitor, and one or more loud speakers. The audio-visual communication system 2750 can be attached to one or more exterior surfaces of the outer casing 2730 of the gyroscopic-module 2700. The means of attachment and provision of power/data supply from within the module can be via, for example quick release mounts and power/data sockets with spring loaded covers to enable the audio-visual communication system 2750 to be easily attached and detached to suit operating requirements.

Examples of output from the audio-visual communication system include project-wide regular broadcasts, such as a weekly message recorded by a project director broadcast to all project staff within an audible and/or visible range of the gyroscopic module and task related briefings and information. For example, the audio-visual communication system can include a large format display that can be brought down to near ground level to display information, such as drawings, 3D models, parts lists, work methods/statements. The display can also be used for in-field conferencing. Other output from the audio-visual communication system can relate to safety or emergency situations, such as an emergency evacuation alarm and/or instructions.

Hence, embodiments of the present invention address or at least ameliorate one or more of the aforementioned problems of the prior art. Embodiments of the present invention provide gyroscopic modules 110 that can be attached directly or indirectly to a load. This enables the gyroscopic modules 110 to be configured on a load or load support structure as desired by a user and without the gyroscopic unit also needing to support the weight of the load. For example, additional gyroscopic modules 110 can be added in times of high wind or when more torque is required. The number of gyroscopic units and/or the configuration of the gyroscopic units on the load support structure or load can also be chosen to balance the load and/or load support structure, provide clearance between the crane and the load support structure, achieve a desired sensor configuration, and/or achieve a desired rotation control while minimising the lifting weight for the crane.

The gyroscopic modules 110 are controlled independently by a controller 120 which enables the gyroscopic modules 110 to be easily configured in, and transition between different configurations.

For example, in some embodiments of the invention, the gyroscopic modules 110 can provide an output moment instantaneously upon being switched on by being configured in a momentum wheel configuration during start up. As the rotors 310 of each gyroscopic module 110 reach a desired angular speed, the gyroscopic modules 110 can be reoriented to the second configuration to maximise the available torque. Alternatively, in some embodiments, two gyroscopic modules 110 are started up opposite directions in the second configuration without applying a torque to the load.

Further, the gyroscopic modules 110 can be reoriented without inducing unwanted roll or pitch of the load. For example, in preferred embodiments, the rotors 310 of a pair of gyroscopic modules 110 are controlled via the controller in a symmetrical fashion such that an equal and opposite torque is applied to the load or load support structure about the x-axis and/or z-axis by each gyroscopic module 110. In practice a small amount of net torque about the x-axis and/or z-axis may be applied due to the accuracy of the controller and other parts of the system. Nevertheless, any torques which are applied about the x-axis and/or z-axis will typically be small enough that gravitational forces will balance the load.

The gyroscopic modules 110 can also be configured in a freewheel configuration which enables the suspended load to be re-oriented manually or by other gyroscopic modules 110 without having to overcome moments induced by the gyroscopic modules 110.

Embodiments of the present invention also provide improved reliability by using a plurality of gyroscopic modules 110. For example, the controller controls a first gyroscopic module 110 or pair of gyroscopic modules 110 to control the rotation of the suspended load up until the point where the first gyroscopic module 110 or pair of gyroscopic modules 110 applies a rapidly reducing amount of torque to the suspended load. The controller 120 then controls a second gyroscopic module 110 or pair of gyroscopic modules 110 to control the rotation of the suspended load.

Each gyroscopic module 110 can be individually and remotely controlled, or synchronised by cable or wirelessly to allow a single control system to cause the modules to work together to achieve the required output behaviour without detailed input being required by the operator.

Batteries of the gyroscopic units can be recharged without removing the gyroscopic units from the load support structure or the load, for example, via wireless charging. This reduces the work required by an operator in using the gyroscopic units. The incorporation of the battery in the rotor of the gyroscopic module improves energy transfer between the battery and the motor coils, saves weight and space, can make production simpler, reduces wiring and connections, and mitigates potential reliability issues with slip ring connections to transfer power to the rotor from a power source in the gimbal or external to the gyroscopic module. Variable-inertia rotors of the present invention and the inclusion of the battery in the rotor also enables more efficient regenerative braking of the rotor.

Embodiments of the present invention also maximise the functionality of the system without re-initialisation during a lift. For example, re-initialisation is performed between lifts by transferring momentum outside the system to the Earth rather than only between the load and the gyroscopic modules.

Embodiments of the present invention provide gyroscopic units that achieve flexibility in useable outputs via sensing and software rather than mechanical complexity. This can reduce manufacturing costs, weight, maintenance costs and susceptibility to damage from impacts.

Sensors can have fixed or reconfigurable locations on the gyroscopic unit, such as, in sockets. This enables the sensors in each gyroscopic unit to be configured as desired by a user, for example, to receive details of the environment around the gyroscopic unit or to receive details of the movement of the load or gyroscopic module.

Embodiments of the present invention can be used for tracking and scheduling across many aspects of a project or a worksite. Progress can be monitored from the unloading of a shipment, to construction, to loading of shipments. Progress can also be monitored using data from other sources, such as, the arrival of shipments at offsite locations for pickup.

One example of the present invention is described below, for construction, where the erection of structural steel is followed by installation of pre-cast concrete floors and then machinery and piping.

A crane picks up load and the processor 1810 identifies the load. The crane places load in required final position. The processor receives data via one or more sensors that the load has arrived at its final position and updates the schedules in the scheduler 1830, for example, scheduling software used for the project or the worksite. For example, the scheduler 1830 or the processor 1810 matches the identification of the load with a line item in the schedule and updates the status of the line item to "installed or "complete". The scheduler 1830 updates the overall percentage complete and re-forecasts end dates for the project.

This enables projects to be scheduled and rescheduled automatically down to the detail of each individual crane lift and progress and movement of materials to be monitored in all aspects of the project.

Some scheduling tools in the prior art include a large amount of detail, for example, 10,000 to 20,000 line items, which is expensive and time consuming to update. The present invention enables scheduling in more detail, and automatic updating of progress on schedules at no marginal cost on a real time basis. This enables improved decision making and more efficient utilisation of resources in a project.

Payments from client to contractor on many construction projects are based on milestones achieved or quantities installed, which in the prior art is achieved by manual measurement or counts of quantities, manual consolidation into reports and then submission of claims. The client will then generally perform some kind of verification of quantities before payment. The present invention provides the benefit that key progress quantities can be automatically captured and therefore reduces the workload and increases the efficiency of both client and contractor.

In some embodiments of the present invention, a scheduling tool called 4D modelling or virtual construction, which is a software based combination of very detailed 3D models with an equally detailed schedule, is used to enable the project to be reviewed and statused visually. The control of the lift can also be automatically controlled based on the 4D model to avoid impacts with existing structure(s). The lift can also be executed against that plan, and then performance of the lift analysed afterwards for quality and training purposes.

Hence, embodiments of the present invention provide a means by which data can be captured and analysed to monitor activities at a minimal marginal cost and improve the productivity, safety and damage control on a worksite, for example, by improved execution and safety of load movements, and feedback to those involved. This also enables tracking of materials and load, for example, to record origins, handling history and final position of loads. Such details can be used to ensure goods are received for payments and track incidents for warranties. The details can also be used for the purpose of quality assurance, progress measurement for site management as well as progress claims and extension of time claims, procurement and payment.

In some industries it is a requirement that all materials installed as part of the permanent works can be tracked back to the manufacturer, date of manufacture, and/or batch number. Embodiments of the present invention can be used to automatically track materials on site and report and consolidate without additional cost, which can bring significant efficiency improvements to a worksite.

Embodiments of the present invention provide gyroscopic units that can be customised and positioned at the most effective locations on a load or load support structure for gathering data about the load or gathering data about the surrounding environment. One critical item in a lift is the rigging and therefore the use of the correct lifting beams and/or spreader bars for the each load is very important. The gyroscopic units of the present application can be flexibly configured on the load or load support structure and are not restricted to being part of a load support structure as in at least some of the prior art. The gyroscopic units can also be relatively small and located for optimum balancing of the load, sensor orientation and/or control of the load.

The sensors of embodiments of the present application can generate data to define all the spatial and material attributes of the load and all logistical data associated with the movement of the load. The provision of quality information on the environment and the individual loads enables the use of the crane in complete workflows inclusive of lift planning, execution and review tools (both physical and digital). The information may also enable new systems not yet envisioned.

The combination of spatial mapping of the worksite with path mapping of the load enables embodiments of the present invention to provide fully automated lifts, which can include, for example, pre-planned load movements which are executed via software and adapted in real-time based on the sensors. The lift can also be automatically coordinated with other parts of the worksite so that use of cranes can be shared, access restricted and resources released at appropriate times.

In this specification, the terms "comprises", "comprising" or similar terms are intended to mean a non-exclusive inclusion, such that an apparatus that comprises a list of elements does not include those elements solely, but may well include other elements not listed.

The reference to any prior art in this specification is not, and should not be taken as, an acknowledgement or any form of suggestion that the prior art forms part of the common general knowledge.

Throughout the specification the aim has been to describe the invention without limiting the invention to any one embodiment or specific collection of features. Persons skilled in the relevant art may realize variations from the specific embodiments that will nonetheless fall within the scope of the invention. For example, it is envisaged that one or more features from two or more embodiments described herein can be combined to form one or more further embodiments.

The invention claimed is:

1. A material management method comprising the steps of:
   receiving, via one or more sensors of two or more control moment gyroscopic modules attached directly or indirectly to a suspended load, data related to the load;
   determining, via a processor, relevant information about the load based on the data received from the one or more of the sensors, the relevant information including a location and/or movement of the load;
   generating, via the processor, a record based on the relevant information about the load;
   comparing, via the processor, the relevant information about the load from the one or more sensors with one or more load identifiers to identify the load;
   updating, via the processor, one or more project plans and/or schedules in real-time based on the identification of the load; and
   displaying, via one or more monitoring systems, the relevant information about the load.

2. The material management method according to claim 1, wherein the one or more sensors include load cells, load recognition sensors, situational awareness sensors, orientation sensors, position sensors and/or motion sensors.

3. The material management method according to claim 1, wherein the relevant information further includes a weight of the load, a pick up time and pickup location of the lift, a path of the load during the lift, a put down time and location of the lift, an orientation of the load at pickup, orientations of the load throughout the lift, an orientation of the load at put down, a time from lift off to release, a distance travelled by the load from pick up to put down in three dimensions, a duration of the lift where the load is travelling, a duration of the lift where the load is stationary, an amount of rotation allowed, and/or an amount of manual input received during the lift.

4. The material management method according to claim 1, wherein the one or more load identifiers includes one or more three-dimensional models of items, RFID codes, barcodes, QR codes, and/or shipping manifests or truck waybills for one or more shipments to or from the worksite.

5. The material management method according to claim 1, wherein the one or more load identifiers are stored in a database.

6. The material management method according to claim 1, wherein the one or more monitoring systems are mobile computing devices.

7. The material management method according to claim 1, further comprising the steps of:
   receiving, via the one or more sensors, data related to a surrounding environment;
   generating, via the processor, safety and productivity information based on the data received from the one or more sensors;
   comparing, via the processor, the generated safety and productivity information with existing project plans and schedules of work;
   updating, via the processor, the safety and productivity information in real-time based on
   detecting any anomalies between the generated safety and productivity information and the existing project plans and schedules of work; and displaying, via one or more monitoring systems, the updated safety and productivity information.

8. The material management method according to claim 7, wherein updating the safety and productivity information involves transmitting, via the processor, real-time alerts to the one or more monitoring systems if there are any anomalies detected.

9. The material management method according to claim 7, wherein the safety and productivity information includes a present state and relative progress of the project plans and schedules.

10. The material management method according to claim 9, wherein the present state and relative progress of the project plans include determining a safe path for the load to avoid other objects or structures.

11. The material management method according to claim 7, wherein the safety and productivity information further includes shape and size of the load, a number of people in an area at pick up and/or put down, a proximity of people to the path of the load during a lift, a proximity of people to the load during put down, a nearest approach to other structures or equipment, a maximum acceleration or shock from any impacts between the load or a load support structure and other objects, wind conditions at different locations or heights during the lift, and/or a maximum output torque employed during the lift.

12. The material management method according to claim 11, further comprising the steps of:
   determining, via the processor, if there are wasted movements and/or excess personnel based on the safety and productivity information; and
   transmitting, via the processor in real-time, an alert to the one or more of the monitoring systems if there are excess moments and/or excess personnel.

13. The material management method according to claim 11, further comprising the step of:
   setting up of safe systems of work and/or controls to mitigate hazards using the safety and productivity information.

14. The material management method according to claim 9, further comprising the step of generating, via the processor, project estimates and schedules based on quantities determined from the one or more sensors.

15. The material management method according to claim 14, wherein the quantities include number of personnel allocated to a task and estimated cycle times for repetitive activities.

* * * * *